United States Patent
Forutanpour et al.

(10) Patent No.: US 9,310,611 B2
(45) Date of Patent: Apr. 12, 2016

(54) METHODS AND SYSTEMS FOR MAKING THE USE OF HEAD-MOUNTED DISPLAYS LESS OBVIOUS TO NON-USERS

(71) Applicant: QUALCOMM Incorporated, San Diego, CA (US)

(72) Inventors: Babak Forutanpour, San Diego, CA (US); Daniel S. Baker, San Diego, CA (US); Devender A. Yamakawa, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 160 days.

(21) Appl. No.: 13/733,758

(22) Filed: Jan. 3, 2013

(65) Prior Publication Data
US 2014/0078175 A1    Mar. 20, 2014

Related U.S. Application Data

(60) Provisional application No. 61/702,623, filed on Sep. 18, 2012.

(51) Int. Cl.
*G09G 5/00* (2006.01)
*G02B 27/01* (2006.01)
*G06F 3/01* (2006.01)

(52) U.S. Cl.
CPC .............. *G02B 27/017* (2013.01); *G06F 3/011* (2013.01); *G06F 3/012* (2013.01); *G06F 3/013* (2013.01); *G02B 2027/014* (2013.01); *G02B 2027/0187* (2013.01)

(58) Field of Classification Search
CPC ......... G06T 7/00; G06T 19/006; G06F 3/011; G06F 3/012; G06F 3/013; G06F 3/014; G02B 27/01; G02B 27/017
USPC ................................................... 345/7–8, 633
See application file for complete search history.

(56) References Cited

U.S. PATENT DOCUMENTS

| 5,757,268 | A  | * | 5/1998 | Toffolo et al. ................. 340/461 |
| 6,396,509 | B1 | * | 5/2002 | Cheng ............................. 715/706 |
| 7,053,915 | B1 |   | 5/2006 | Jung et al. |
| 7,227,976 | B1 |   | 6/2007 | Jung et al. |
| 8,184,070 | B1 | * | 5/2012 | Taubman ........................... 345/8 |
| 8,406,290 | B2 | * | 3/2013 | Li et al. ..................... 375/240.02 |
| 8,514,295 | B2 | * | 8/2013 | Lee .............................. 348/222.1 |
| 8,704,682 | B1 | * | 4/2014 | Chau ........................ 340/995.19 |
| 8,947,322 | B1 | * | 2/2015 | Chi et al. ........................... 345/8 |
| 2004/0183815 | A1 | * | 9/2004 | Ebert ............................. 345/619 |
| 2005/0204287 | A1 |   | 9/2005 | Wang |
| 2006/0086022 | A1 | * | 4/2006 | Would et al. ..................... 40/584 |

(Continued)

OTHER PUBLICATIONS

Hicks et al., "Eyekon: Distributed Augmented Reality for Soldier Teams." Twenty First Century Systems Inc Papillion NE, Jun. 2003.*

(Continued)

*Primary Examiner* — Ulka Chauhan
*Assistant Examiner* — Sae Won Yoon
(74) *Attorney, Agent, or Firm* — Kilpatrick Townsend & Stockton LLP

(57) ABSTRACT

Various arrangements are presented for positioning virtual objects displayed by a head-mounted display. A location of a person within a real-world scene may be determined. A virtual object may be displayed to a user such that the virtual object is superimposed over the face of the person.

33 Claims, 10 Drawing Sheets

300

| | Virtual Object Ranking | Person Ranking |
|---|---|---|
| 1 | Email account | Ned Smith |
| 2 | Social media account | Kevin Doe |
| 3 | Stock ticker | Andrew Body |
| 4 | Weather widget | Tommy Body |
| 5 | News website | *Unknown Person 1* |
| 6 | Sports website | Tonya Doe |
| 7 | Blog viewer | *Unknown Person 2* |
| 8 | Coupon Deals App. | Edward Smith |

310    320

(56) References Cited

U.S. PATENT DOCUMENTS

| | | | |
|---|---|---|---|
| 2006/0132382 A1* | 6/2006 | Jannard | 345/8 |
| 2008/0240563 A1* | 10/2008 | Takano et al. | 382/173 |
| 2009/0003662 A1 | 1/2009 | Joseph et al. | |
| 2009/0087099 A1* | 4/2009 | Nakamura | 382/190 |
| 2010/0001928 A1* | 1/2010 | Nutaro | 345/8 |
| 2011/0158478 A1 | 6/2011 | Yamada et al. | |
| 2011/0267374 A1* | 11/2011 | Sakata et al. | 345/672 |
| 2012/0026191 A1 | 2/2012 | Aronsson et al. | |
| 2012/0050141 A1* | 3/2012 | Border et al. | 345/8 |
| 2012/0062444 A1* | 3/2012 | Cok et al. | 345/8 |
| 2012/0075168 A1* | 3/2012 | Osterhout et al. | 345/8 |
| 2012/0120499 A1* | 5/2012 | Harrison et al. | 359/631 |
| 2012/0135784 A1* | 5/2012 | Lee et al. | 455/556.1 |
| 2012/0183137 A1* | 7/2012 | Laughlin | 380/200 |
| 2012/0206443 A1 | 8/2012 | Kimura et al. | |
| 2012/0208551 A1* | 8/2012 | Hill | 455/456.1 |
| 2012/0210240 A1* | 8/2012 | Neystadt et al. | 715/739 |
| 2013/0044129 A1* | 2/2013 | Latta et al. | 345/633 |
| 2013/0050258 A1* | 2/2013 | Liu et al. | 345/633 |
| 2013/0169853 A1* | 7/2013 | Luong | 348/345 |

OTHER PUBLICATIONS

Hicks, Jeffrey D., et al. "Eyekon: augmented reality for battlefield soldiers." Software Engineering Workshop, Dec. 2002. Proceedings. 27th Annual NASA Goddard/IEEE. IEEE, Dec. 2002.*

International Search Report and Written Opinion—PCT/US2013/059204—ISA/EPO—Dec. 10, 2013.

* cited by examiner

| | Virtual Object Ranking | Person Ranking |
|---|---|---|
| 1 | Email account | Ned Smith |
| 2 | Social media account | Kevin Doe |
| 3 | Stock ticker | Andrew Body |
| 4 | Weather widget | Tommy Body |
| 5 | News website | *Unknown Person 1* |
| 6 | Sports website | Tonya Doe |
| 7 | Blog viewer | *Unknown Person 2* |
| 8 | Coupon Deals App. | Edward Smith |

FIG. 3

METHODS AND SYSTEMS FOR MAKING THE USE OF HEAD-MOUNTED DISPLAYS LESS OBVIOUS TO NON-USERS

CROSS-REFERENCES TO RELATED APPLICATIONS

This application claims priority from co-pending U.S. Provisional Patent Application No. 61/702,623, filed Sep. 18, 2012 entitled "Methods And Systems for Making the Use of Head-mounted displays Less Obvious to Non-Users", which is hereby incorporated by reference, as if set forth in full in this document, for all purposes.

BACKGROUND OF THE INVENTION

A person may find himself in a situation where he does not desire to be fully socially engaged with other persons in his vicinity, but would rather focus his attention on information derived from some other source. For example, a person in attendance at a meeting may be uninterested in a presentation being given by a speaker and may instead desire to focus his attention on his email account. As another example, during a face-to-face conversation, a person may desire to multitask and review his social media account. Typically, to do this, a multi-tasking person may inconspicuously attempt to view a screen of a mobile device, such as a cellular phone, to access information while trying to give the speaker the impression that he is actively engaged in listening to the presentation or participating in the conversation. While such viewing of mobile devices has become ubiquitous, in many circumstances it may be perceived as rude by persons in the vicinity of the multitasker, including the speaker.

SUMMARY

In some embodiments, a method for positioning virtual objects displayed by a head-mounted display is presented. The method may include determining a location of a face of a person within a real-world scene. The method may include displaying, via the head-mounted display, a virtual object such that the virtual object is superimposed over the face of the person.

Embodiments of such a method may include one or more of the following: The content of the virtual object may be unrelated to the person. The method may include determining an identity of the person. The method may include selecting the virtual object from among a plurality of virtual objects based on the identity of the person. The method may include receiving a set of person rankings from a user for a plurality of persons. The method may include receiving a set of virtual object rankings from the user for the plurality of virtual objects. Selecting the virtual object from among the plurality of virtual objects based on the identity of the person may be based on the set of person rankings and the set of virtual object rankings. The method may include, after displaying the virtual object such that the virtual object is superimposed over the face of the person, relocating the virtual object to being superimposed over a second face of a second person after a threshold period of time. The method may include, after displaying the virtual object such that the virtual object is superimposed over the face of the person, determining a user is looking up at greater than a threshold angle. The method may include, in response to determining the user is looking up at greater than the threshold angle, relocating the virtual object such that the virtual object is not superimposed over the face of the person. The virtual object may be presented by the head-mounted display such that the virtual object is visible only to a user of the head-mounted display. The virtual object may be transparent such that the face of the person and the virtual object are simultaneously visible to a user of the head-mounted display. The method may include determining an amount of motion by the person. The method may include, after displaying the virtual object such that the virtual object is superimposed over the face of the person, displaying, via the head-mounted display, the virtual object such that the virtual object is superimposed over the face of a second person due to the determined amount of motion by the person. The method may include, before displaying the virtual object such that the virtual object is superimposed over the face of the person, selecting the person from a plurality of persons using brightness levels of each person of the plurality of persons.

In some embodiments, a system for presenting virtual objects. The system may include an image capture device, a head-mounted display, a processor, and a memory communicatively coupled with and readable by the processor. The memory may have stored therein processor-readable instructions which, when executed by the processor, cause the processor to determine a location of a face of a person within a real-world scene using an image captured by the image capture device. The processor readable instructions may cause the processor to cause, via the head-mounted display, a virtual object to be displayed such that the virtual object is superimposed over the face of the person.

Embodiments of such a system may include one or more of the following: Content of the virtual object may be unrelated to the person. The processor-readable instructions may further comprise processor-readable instructions which, when executed by the processor, cause the processor to determine an identity of the person. The processor readable instructions may cause the processor to select the virtual object from among a plurality of virtual objects based on the identity of the person. The processor readable instructions may cause the processor to receive a set of person rankings from a user for a plurality of persons. The processor readable instructions may cause the processor to receive a set of virtual object rankings from the user for the plurality of virtual objects. The processor-readable instructions which, when executed by the processor, cause the processor to select the virtual object from among the plurality of virtual objects based on the identity of the person may further include processor-readable instructions which, when executed by the processor, cause the processor to use the set of person rankings and the set of virtual object rankings to select the virtual object from among the plurality of virtual objects based on the identity of the person. The processor-readable instructions may further comprise processor-readable instructions which, when executed by the processor, cause the processor to, after causing the virtual object to be displayed such that the virtual object is superimposed over the face of the person, relocate the virtual object to being superimposed over a second face of a second person after a threshold period of time.

Additionally or alternatively, embodiments of such a system may include one or more of the following: The processor-readable instructions may further comprise processor-readable instructions which, when executed by the processor, cause the processor to, after causing the virtual object to be displayed such that the virtual object is superimposed over the face of the person, determine a user of the head-mounted display is looking up at greater than a threshold angle. The processor readable instructions may cause the processor to, in response to determining the user is looking up at greater than the threshold angle, cause display of the virtual object to be relocated such that the virtual object is not superimposed over the face of the person. The virtual object may be presented by the head-mounted display such that the virtual object is visible only to a user of the head-mounted display. The virtual object may be transparent such that the face of the person and the virtual object are simultaneously visible to a user of the head-mounted display. The processor-readable instructions may further comprise processor-readable instructions which, when executed by the processor, cause the processor to determine an amount of motion by the person. The processor-readable instructions may further comprise processor-readable instructions which, when executed by the processor, cause the processor to, after causing the virtual object to be displayed such that the virtual object is superimposed over the face of the person, causing the virtual object to be displayed such that the virtual object is superimposed over the face of a second person due to the determined amount of motion by the person. The processor-readable instructions may further comprise processor-readable instructions which, when executed by the processor, cause the processor to before causing the virtual object to be displayed such that the virtual object is superimposed over the face of the person, select the person from a plurality of persons using brightness levels of each person of the plurality of persons.

In some embodiments, a computer program product residing on a non-transitory processor-readable medium for positioning virtual objects displayed by a head-mounted display is presented. The computer program product may include processor-readable instructions configured to cause a processor to determine a location of a face of a person within a real-world scene. The processor readable instructions may cause the processor to cause, via the head-mounted display, a virtual object to be displayed such that the virtual object is superimposed over the face of the person.

Embodiments of such a computer program product may include one or more of the following: Content of the virtual object may be unrelated to the person. The processor-readable instructions may further comprise processor-readable instructions which, when executed by the processor, cause the processor to determine an identity of the person. The processor readable instructions may cause the processor to select the virtual object from among a plurality of virtual objects based on the identity of the person. The processor readable instructions may cause the processor to receive a set of person rankings from a user for a plurality of persons. The processor readable instructions may cause the processor to receive a set of virtual object rankings from the user for the plurality of virtual objects. The processor-readable instructions which, when executed by the processor, cause the processor to select the virtual object from among the plurality of virtual objects based on the identity of the person may include processor-readable instructions which, when executed by the processor, cause the processor to use the set of person rankings and the set of virtual object rankings to select the virtual object from among the plurality of virtual objects based on the identity of the person. The processor readable instructions may cause the processor to, after causing the virtual object to be displayed such that the virtual object is superimposed over the face of the person, relocate the virtual object to being superimposed over a second face of a second person after a threshold period of time.

Additionally or alternatively, embodiments of such a computer program product may include one or more of the following: The processor readable instructions may cause the processor to, after causing the virtual object to be displayed such that the virtual object is superimposed over the face of the person, determine a user of the head-mounted display is looking up at greater than a threshold angle. The processor readable instructions may cause the processor to, in response to determining the user is looking up at greater than the threshold angle, cause display of the virtual object to be relocated such that the virtual object is not superimposed over the face of the person. The virtual object may be presented by the head-mounted display such that the virtual object is visible only to a user of the head-mounted display. The virtual object may be transparent such that the face of the person and the virtual object are simultaneously visible to a user of the head-mounted display. The processor readable instructions may cause the processor to determine an amount of motion by the person. The processor readable instructions may cause the processor to, after causing the virtual object to be displayed such that the virtual object is superimposed over the face of the person, causing the virtual object to be displayed such that the virtual object is superimposed over the face of a second person due to the determined amount of motion by the person. The processor readable instructions may cause the processor to, before causing the virtual object to be displayed such that the virtual object is superimposed over the face of the person, select the person from a plurality of persons using brightness levels of each person of the plurality of persons.

In some embodiments, an apparatus for positioning displayed virtual objects is presented. The apparatus may include means for determining a location of a face of a person within a real-world scene. The apparatus may include means for displaying a virtual object such that the virtual object is superimposed over the face of the person.

Embodiments of such an apparatus may include one or more of the following: Content of the virtual object may be unrelated to the person. The apparatus may include means for determining an identity of the person. The apparatus may include means for selecting the virtual object from among a plurality of virtual objects based on the identity of the person. The apparatus may include means for receiving a set of person rankings from a user for a plurality of persons. The apparatus may include means for receiving a set of virtual object rankings from the user for the plurality of virtual objects. The means for selecting the virtual object from among the plurality of virtual objects based on the identity of the person may be based on the set of person rankings and the set of virtual object rankings. The apparatus may include means for relocating the virtual object to being superimposed over a second face of a second person after a threshold period of time, wherein relocating occurs after displaying the virtual object such that the virtual object is superimposed over the face of the person. The apparatus may include means for determining a user is looking up at greater than a threshold angle, wherein determining occurs after displaying the virtual object such that the virtual object is superimposed over the face of the person. The apparatus may include means for relocating the virtual object such that the virtual object is not superimposed over the face of the person, wherein relocating occurs in response to determining the user is looking up at greater than the threshold angle. The virtual object may be presented such that the virtual object is visible only to a user of the apparatus. The virtual object may be transparent such that the face of the person and the virtual object are simultaneously visible to a user of the apparatus. The apparatus may include means for determining an amount of motion by the person. The apparatus may include means for displaying the virtual object such that the virtual object is superimposed over the face of a second person due to the determined amount of motion by the person. The apparatus may include means for selecting the person from a plurality of persons using brightness levels of each person of the plurality of persons prior to displaying the virtual object such that the virtual object is superimposed over the face of the person.

BRIEF DESCRIPTION OF THE DRAWINGS

FIG. 3 illustrates an embodiment of a virtual object ranking and a person ranking.

DETAILED DESCRIPTION OF THE INVENTION

Figure 1:
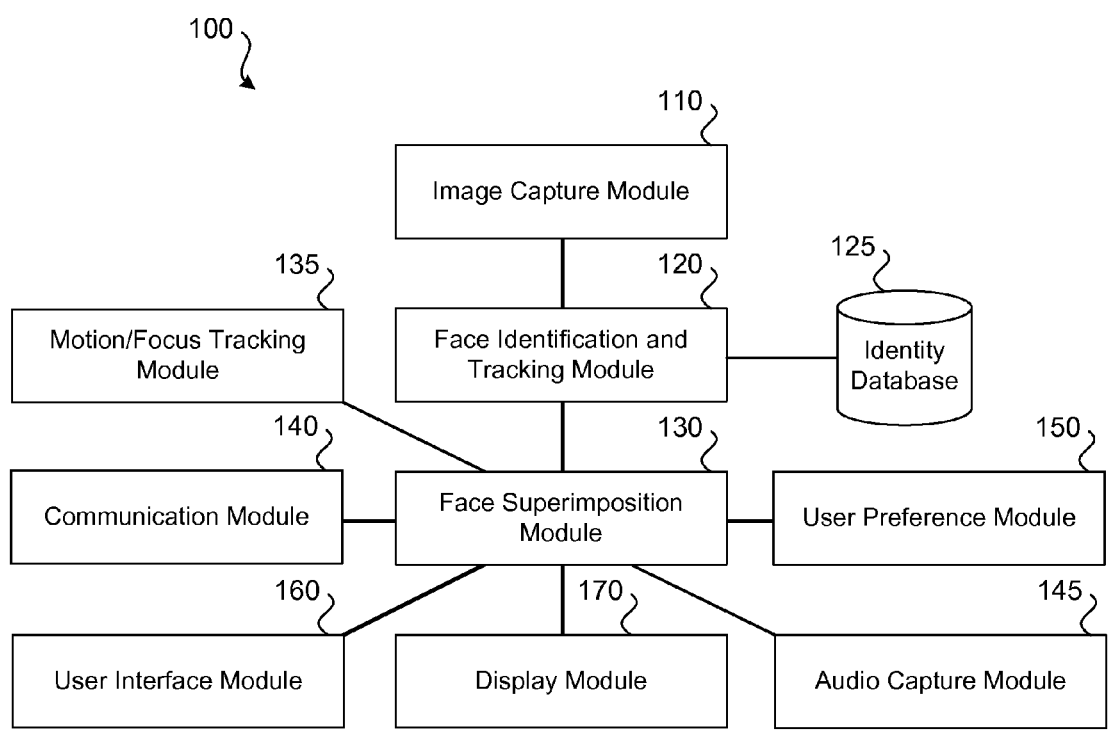
FIG. 1 illustrates an embodiment of a system configured to superimpose virtual objects displayed by a head-mounted display over the faces of persons present within a scene.

A head-mounted display (HMD) which may be part of an augmented reality (AR) device, such as augmented reality glasses, may be used to superimpose information over a scene being viewed by a user. The user, who is wearing the HMD and using the AR device, may view a scene that contains real-world objects, such as other persons and physical objects. The AR device may capture information about the scene and, at least partially based on real-world objects within the scene, present information as virtual objects to the user that is superimposed on the scene. The virtual objects may be presented in such a manner such that only the user can view the virtual objects, other persons may be substantially prevented from seeing the virtual objects as presented by the HMD. Therefore, while using an AR device, a user may view a real-world scene that is superimposed with one or more virtual objects for viewing only by the user. Interacting with these one or more virtual objects may involve the user moving and/or focusing his eyes to read or otherwise view the virtual objects.

A user's interactions with virtual objects superimposed on a scene by an HMD of an AR device may typically be obvious to other persons in the user's vicinity based on the user's eye, head, hand, and/or other body movements. For instance, if a user appears to be looking at an uninteresting part of a scene (such as the ceiling, floor, or an empty chair), it may be obvious to those near the user that the user is focusing his attention on a virtual object presented to the user by the HMD and, thus, that the user is not focusing his attention on what is socially expected to, such as a person present in the real-world scene that is speaking.

When a user is using an AR device in a social environment, the user may desire to appear to be interacting with (e.g., listening to, looking at) other persons present in the vicinity. While the user desires to appear to be interacting with one or more other persons, the user may be focusing at least some of his attention on one or more virtual objects presented to the user via the HMD of the AR device. In a conventional arrangement, if one or more other persons are watching the user, it may be obvious based on the user's eye and/or facial motions when the user is focusing his attention on virtual objects rather than persons present in the real-world scene. For instance, while the user is focusing his attention on virtual objects, the user may appear to be staring intermittently up, down, left, and right, and at least occasionally in the direction of real-world objects of little interest (e.g., a blank wall or the floor). Further, the user's eye movements, such as moving rapidly back and forth, may reveal to other persons that the user is likely reading text of a virtual object or otherwise interacting with virtual objects.

Rather than the user outwardly appearing to be interacting with virtual objects, the user may desire to appear to be socially engaged with one or more other persons in the scene. For the user to appear socially engaged with other persons in the room, eye contact (or at least the appearance of eye contact) between the user and one or more others persons present in the scene may be beneficial so that the user may at least appear to be looking at one or more persons in the room, such as a person currently speaking. To give this appearance, virtual objects displayed to the user by the HMD of the AR device may be superimposed over the faces (and/or heads) of persons present in the scene such that when the user is looking at virtual objects superimposed over the faces, the user appears to be socially engaged with the other persons in the room, regardless of whether the user's attention is focused fully or partially focused on a virtual object.

Persons and virtual objects may be assigned rankings. For instance, persons may be ranked by the user according to how frequently the user tends to interact with them or how comfortable the user feels interacting with them. As an example, a user's wife may be ranked highest, the user's son may be ranked second, while the user's boss at work may a ranked lower. For virtual objects displayed by the HMD to the user, the user may, for example, rank his email account highest and his social media page second. These person and virtual object rankings may be used to determine whose face is superimposed with which virtual object. For example, the highest ranked virtual object may be presented as superimposed over the face of the highest ranked person present in the scene.

Referring to the previous example, if the user is in a room with only his son, the son's face may be superimposed with the user's email account because the email account has been given the highest ranking and the son is the highest ranked person present in the scene. However, if multiple persons are in a scene observed by the user, such as the user's wife and the user's son, the wife's face may be superimposed with the user's email account and the son's face may be superimposed with the user's social media account. If the wife or son is talking or looking at the user, the user may appear to be looking at and be socially engaged with the wife or son while the user is at least partially directing his attention to the virtual object superimposed by the augmented reality device on the person's face.

Certain conditions may be present that affect the use of a ranking of virtual objects and persons to determine over which person's face a virtual object is superimposed. For instance, a highest ranked virtual object may be superimposed over the face of a person speaking. As such, if the user focuses his attention on whoever is speaking (which can be expected to change during a typical conversation), the user can continue to a look at a particular virtual object. The virtual objects superimposed over other faces present in the scene may be reassigned to accommodate the highest priority virtual object being superimposed over the face of a person speaking.

Virtual objects may be superimposed over the faces of persons such that the virtual objects appear to be a similar distance away from the user as the face in the real-world scene. As a person moves, the virtual object associated with the person may move with the person. The virtual objects may only be partially anchored to the person's face, such that small or sudden movements by the person's face or head do not result in the virtual object moving (thus, for example, making text of the virtual object easier to read). Further, virtual objects may only remain anchored to a person's face as long as the user's head or eyes are aligned with the horizon within a threshold angle range. If the user looks significantly up or down, the virtual objects may become unanchored from the faces of the persons and may instead appear to float in space.

While present in a scene with other people, a typical person may tend to look directly at a person (who may or may not be talking) for relatively short periods of time. Thus, to reduce the likelihood that a user wearing a HMD appears to stare at a person for an uncomfortably long period of time, virtual objects may shift in location within the virtual field of view of the scene. For example, the virtual objects may shift being superimposed over various persons' faces. In some embodiments, a virtual object may be superimposed over a face or head of whichever person is talking in a scene. As such, if the user continues to look at the virtual object as the virtual object moves, it appears the user is engaged with the person speaking. In some embodiments, if a person whose face or head is covered with a virtual object moves within or leaves a real-world scene, the virtual object associated with the person may be relocated to the next closest person in the real-world scene.

In some embodiments, the virtual object superimposed over the face of a person may facilitate interactions between the user and the person. For instance, if the user is hearing impaired, the virtual object may contain text that says what the person has spoken. As such, the user can at least appear to maintain eye contact with the person while reading what the person has said. In some embodiments, similar text may be used to provide a translation from a foreign language of speech by the person into a native language of the user. To further facilitate the ability of the user to at least appear to maintain eye contact with the speaker, such displayed text may be scrolled over the person's face (and, more specifically, the person's eyes) such that the speech can be read by the user while at least appearing to look directly at the eyes of the speaker.

FIG. 1 illustrates an embodiment of a system 100 configured to superimpose virtual objects displayed by an HMD of an AR device over faces of persons present within a scene. As such, system 100 may represent at least some of the components of an AR device. System 100 may include image capture module 110, face identification and tracking module 120, face superimposition module 130, communication module 140, user preference module 150, user interface module 160, and display module 170. Other embodiments of system 100 may include fewer or greater numbers of components. Commonly known components have been omitted from FIG. 1 for simplicity, such as power supply components.

Image capture module 110 may be configured to periodically capture an image of a scene that is being viewed by a user. For instance, image capture module 110 may include an image capture device that is positioned to capture a field-of-view of a scene that is being viewed by a user. Image capture module 110 may include a camera. The camera may be pointed such that it captures images of a scene viewed by the user. Image capture module 110 may capture images rapidly. For instance, multiple frames may be captured by image capture module 110 every second. Some or all of these images may be processed to determine the location of various objects within the real-world scene, such as persons and their identities.

Images captured by image capture module 110 may be passed to face identification and tracking module 120. Face identification and tracking module 120 may first locate each face present within an image received from image capture module 110. Face identification and tracking module 120 may then determine if the face corresponds to a previously-identified face. Face identification and tracking module 120 may have access to an identity database 125 of persons with whom the user has previously interacted, such as family members, co-workers, and/or neighbors. Identity database 125 may contain information sufficient to identity a person, such as an image of the person's face. A person may be added to identity database 125 based on user input. In some embodiments, identity database 125 is accessed remotely and contains identities of persons captured using multiple AR devices. As such, identity database 125 may contain identity information on more than only persons known by the user of system 100.

Once a face has been located and, possibly, identified, a location of the face and an identity of the person associated with the face may be passed to face superimposition module 130. If the identity of the person associated with the face is not identified, an indication that the face is associated with an unknown person may be passed to face superimposition module 130.

Face superimposition module 130 may receive locations and identities associated with faces (and/or heads) from face identification and tracking module 120. Face superimposition module 130 may determine if the face should be superimposed with a virtual object. For example, based on input received from a user, face superimposition module 130 may not superimpose virtual objects on any face. (That is, the user may have the ability to turn on and off the superimposition of virtual objects on faces.) Face superimposition module 130 may determine which virtual object should be superimposed over the face. Determining which virtual object should be superimposed over the face may be based on the identity of the person associated with the face, whether the person associated with the face is talking, whether the user is looking at the person, whether the user is talking to the person, and/or a set of user preferences defined by the user.

Motion/focus tracking module 135 may be used to determine an angle of the user's head and/or the direction of the user's eye focus. To track the angle of the user's head, an accelerometer or gyroscope may be used. In some embodiments, depending on the angle of the user's head, virtual objects superimposed on persons' faces may be unanchored from the faces for display. This may be useful if the user does not care whether other persons in the vicinity know the user is directing his attention to virtual objects. Alternatively, the user may be looking up, as if lost in thought, while is actually directly his attention to virtual objects.

Motion/focus tracking module 135 may include a camera or other form of eye tracking device that may be used to determine where the focus of the user's eyes are directed. Rather than the user's head needing to be at a particular angle, the direction of focus of the user's eyes may determine whether virtual objects superimposed on persons' faces may be unanchored for display. As such, if the user's angle of view, which may be determined by the angle of the user's head and/or the direction of focus of the user's eyes, exceeds a threshold angle from the horizon, virtual objects superimposed on persons' faces may be unanchored for display and may be presented in an alternate format, such as arranged in a horizontal series.

User preference module 150 may be a computer-readable storage medium configured to store a ranking of virtual objects and/or a ranking of persons, such as described in relation to FIG. 3. Based on these rankings, which virtual objects are superimposed over which faces may be determined. For the ranking of the persons, the user may rank persons that have previous had their image captured based on the user's comfort level with the person. For instance, when a person that the user is uncomfortable is present (e.g., the user's boss), the user may not wish to superimpose a virtual object over the person's face. For a person that the user is comfortable with (e.g., the user's daughter), the user may wish to superimpose a virtual object. Persons that have previously had their image captured by the image capture module 110 may be ranked or otherwise assigned a comfort level.

Virtual objects may also be ranked. Such ranks may be stored by user preference module 150. A user may assign virtual objects a ranking based on how often the virtual is desired to be viewed by the user. For instance, the user may assign his email account the highest ranking, followed by a stock ticker, social media page, a news webpage, etc. Accordingly, when a person is present within a scene, the highest ranked virtual object may be superimposed over the face of the person.

Rankings of virtual objects may be used in combination with rankings of persons to determine if and which virtual object should be superimposed over the face of a person. For instance, if multiple persons are present within a scene viewed by the user, the highest ranked virtual object may be superimposed over the face of the highest ranked person in the scene. The second highest ranked virtual object may be superimposed over the face of the second highest ranked person in the scene. If one of the persons leaves the scene, which virtual object is superimposed over the face of which person may be reevaluated.

It should be understood that while the determination of which virtual object is superimposed over the face of a person may be based on the identity of the person, the content of the virtual object is not be related to the identity of the person. As an example of this, consider a social media page. The social media made may be displayed to the user over the face of a person. While based on the ranking of the person and the ranking of the virtual object the social media page virtual object may be superimposed over the face of the person, the content of the social media page may be unrelated to the identity of the person. The social media page may be relevant to the user of the AR device, not the person whose face the social media page is superimposed over. As such, the content of the virtual object may not change regardless of the person whose face the virtual object is superimposed on.

Based on the location of the face, the identity of a person associated with the face, and, possibly, rankings from the user preference module 150, face superimposition module 130 may superimpose a virtual object over the face of a person present in the scene. As such, the virtual object may only be visible to the user and may appear to be superimposed over the face of a person in the scene. As such, when the user is looking at the superimposed virtual object, it may appear to the person that the user is looking at the face of the person (e.g., making eye contact). Multiple virtual objects may be superimposed over the face of multiple persons present in the scene simultaneously. As such, if the user switches his focus from one person to another, he may also switch which virtual object he is looking at.

Display module 170 may serve as the output device for face superimposition module 130 to present the virtual objects to the user. Display module 170 may be a head-mounted display (HMD). For instance, display module 170 may include a projector that either projects light directly into one or both eyes of the user or projects the light onto a reflective surface that the user views. In some embodiments, the user wears glasses (or a single lens) onto which light is projected by the display module 170. Accordingly, the user may view virtual objects and real-world objects present in the scene simultaneously. A superimposed virtual object may be semi-transparent such that the user can still at least partially see a real-world object, such as a person's face, behind the virtual object. Display module 170 may be configured such that only the user can view the virtual objects. To other persons present in the vicinity of the user, since display module 170 may be a HMD, the virtual objects may not be substantially visible. As such, to other persons in the vicinity of the user, it may not be possible to discern whether display module 170 is or is not presenting the user with one or more virtual objects and/or if the virtual objects are superimposed over the faces or heads of persons present in the scene.

User interface module 160 may permit the user to provide input to system 100. For example, user interface module 160 may be a bracelet that has one or more buttons on it. The user may actuate these buttons to provide input to system 100. For example, the user may want to provide rankings of virtual objects and/or person, activate/deactivate superimposition of faces, and/or interact with virtual objects (e.g., open an email within the user's email account). While a bracelet is one form of user interface, it should be understood that various other user interfaces may be used for a user to provide input, such as a voice-recognition module or eye-tracking module which may be incorporated with motion/focus tracking module 135.

Figure 9:
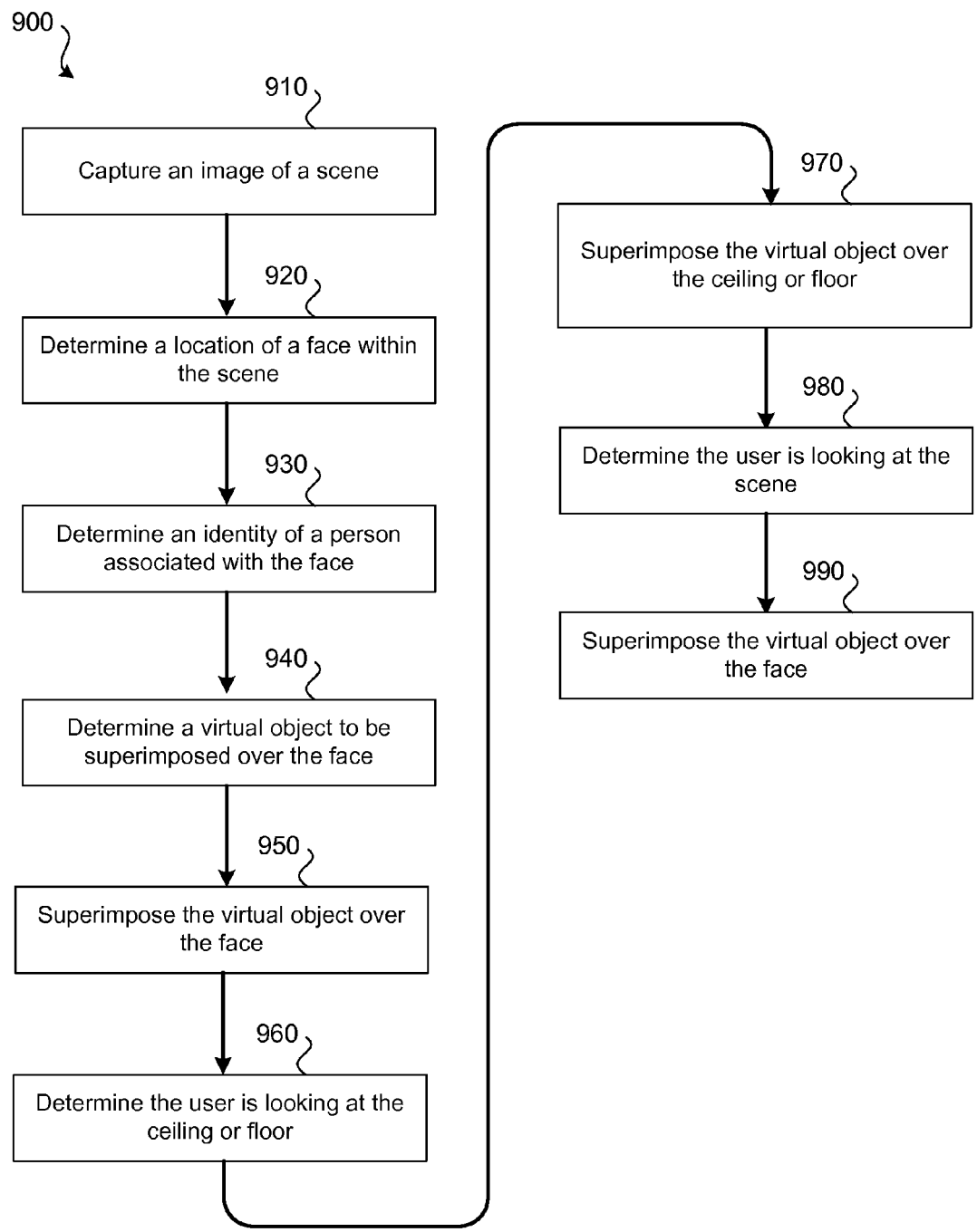
FIG. 9 illustrates an embodiment of a method for adjusting the superimposition of a virtual object displayed by a head-mounted display over the face of a person talking based on where the user is looking.

At least some of the module of system 100 may be implemented using a computerized device, such as the computer system of FIG. 9. The modules of system 100 may be combined or divided into fewer or greater numbers of modules. Multiple modules may be implemented by a computerized device. For instance, face identification and tracking module 120 and face superimposition module 130 may be implemented as instructions executed by a computerized device (e.g., a processor, computer system). Further, it should be understood that the connections between modules of system 100 are exemplary, in other embodiments, the modules may be interconnected differently. Communication among any of the modules of system 100 may be possible.

Figure 2:
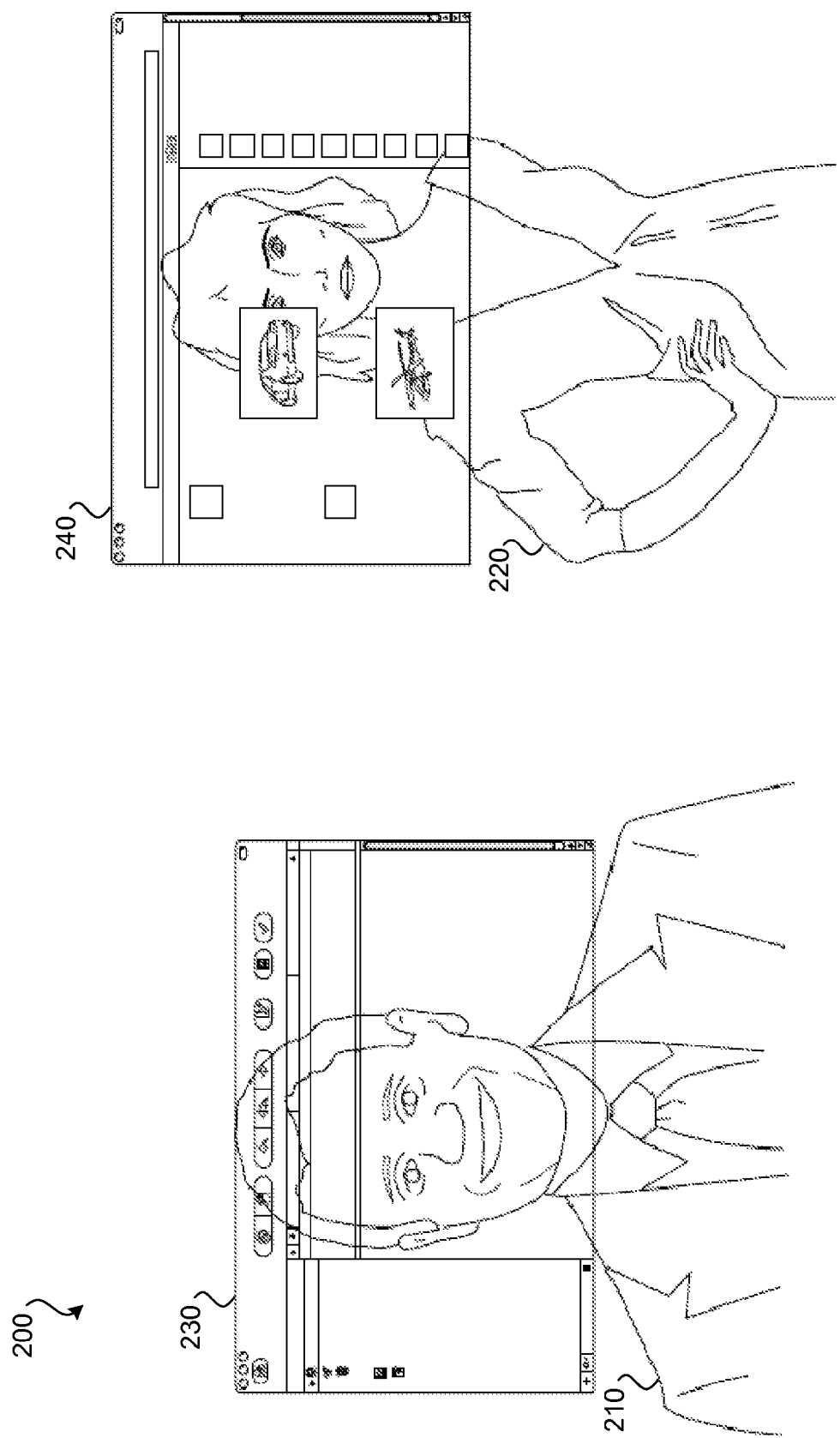
FIG. 2 illustrates an embodiment of a first-person point-of-view of a scene with virtual objects superimposed over the faces of multiple persons.

FIG. 2 illustrates an embodiment of a first-person point-of-view 200 of a scene, as viewed by a user, with virtual objects superimposed over the faces of multiple persons present within the scene. First-person point-of-view 200 is from the perspective of a user who is wearing a HMD of an AR device. For example, system 100 of FIG. 1 may be worn (or otherwise used) by the user such that virtual objects may be superimposed on a scene by the HMD. As such, system 100 or some other system configured to superimpose faces of persons present within a scene with virtual objects may be used to create the virtual field-of-view of FIG. 2.

First-person point-of-view 200 may be seen by a user using system 100 or some other system configured to superimpose faces of persons present within a scene with virtual objects. In the scene of first-person point-of-view 200, two persons are present: person 210 and person 220. Person 210 is looking directly at the user (as represented by person 210 appearing to look directly out of the figure). Therefore, person 210 and the user may be socially engaged, such as in a conversation. Person 220 is generally facing the user and is speaking. For example, person 220 may be a speaker addressing a group of people (such as during a presentation). Person 220 is located a greater distance away from the user than person 210.

Over the face of person 210, virtual object 230 has been superimposed. While the user is looking at virtual object 230, it may appear to person 210 (and other persons in the vicinity) that the user is focusing his attention on person 210 (such as, by appearing to make eye contact). However, the user may instead be focusing at least some of his attention on virtual object 230 that is superimposed over the face of person 210. Since virtual object 230 is displayed by an HMD to the user, other persons in the vicinity may be unaware that the HMD is either present or is superimposing a virtual object over the face of person 210. Accordingly, only the user may see virtual object 230. While appearing to look at and socially interact with person 210, the user may, for example, be reading an email. In the example of FIG. 2, the face of person 210 is superimposed with the user's email account. As such, the content of virtual object 230 may be unrelated to person 210 (that is, the content of virtual object 230 may not vary based on which person's face it is superimposed over).

To be clear, it should be understood that the content of a virtual object is disjointed from the person. As such, the shape or content of the virtual object is not related to the person's identity. For example, the user's email account may be superimposed over the face of person 210. If the user's email account is superimposed over the face of person 220, the content of the user's email account would remain identical, simply the location of the email account presented as a virtual account may change.

Over the face of person 220, virtual object 240 is superimposed. While the user is looking at virtual object 240, it may appear to person 220 (and other persons in the vicinity, such as person 210) that the user is focusing his attention on person 220, such as by appearing to make eye contact and be listening to what person 220 is saying. Since virtual object 240 is displayed by the HMD to the user, other persons in the vicinity may be unaware that the HMD is either present or is superimposing a virtual object over the face of person 220. While appearing to look at and socially interact with person 220, the user may be viewing his social media account (e.g., FACEBOOK, TWITTER). In the example of FIG. 2, the face of person 220 is superimposed with the user's social media account. As such, the content of virtual object 240 may be unrelated to person 220 (that is, the content of virtual object 240 may not vary based on which person's face it is superimposed over).

Which virtual object is superimposed over the face of which person may be based on ranking assigned by the user (or automatically assigned) to the virtual objects and/or the persons. For instance, a user may assign various virtual objects a ranking. FIG. 3 illustrates an embodiment of a ranking table 300 of virtual object rankings and person rankings. Ranking table 300 may be stored as part of user preference module 150 of system 100 of FIG. 1. As such, ranking table 300 may be stored using a computer readable storage medium. In ranking table 300, the user of the AR device has assigned a ranking order to virtual objects in virtual object ranking column 310 and a ranking order to persons in person ranking column 320.

According to ranking table 300, the highest ranked virtual object may be superimposed over the face of the highest ranked person present within a scene. As an example, in ranking table 300, the user has assigned his email account the highest ranking and his social media account the second highest ranking.

In the illustrated embodiment of FIG. 2, the user is socially engaged with person 210 (who, for the purposes of this example, is "Ned Smith"), thus person 210 is selected to be used for display of the first-ranked virtual object 230, which according to ranking table 300 is the user's email account. The second-ranked virtual object 240, which according to ranking table 300 is the user's social media account, is superimposed over the face of the other person present, person 220, who for this example is "Tonya Doe." If other persons enter the scene, additional virtual objects may also be superimposed over their faces, which may result in which virtual objects are assigned to which person changing.

For the illustrated embodiment of ranking table 300, the highest ranked virtual object is superimposed over the highest ranked person listed in person ranking column 320. In other embodiments, a specific virtual object may be associated with a specific person. For instance, when a person, such as "Tommy Body" is present within a scene viewed by the user, the weather widget may be superimposed over the face of Tommy Body. Ranking table 300 may take into account persons who do not have an identity stored by the AR device. For instance, "unknown persons" may be listed within person ranking column 320. As such, when a person is present within a scene viewed by the user that is not recognized by the AR device, such persons may still have their faces superimposed with a virtual object. For example, if only an unknown person is present with a scene viewed by a user, the users e-mail account may be superimposed over the unknown person's face as a virtual object.

The person rankings of ranking table 300 may be established by the user based on persons that the user is comfortable with and/or does or does not desire a virtual object to be superimposed over their face. For example, a user may be at ease around his wife, so the user may give his wife a high ranking. This may result in the wife's face being used to display one of the highest ranked virtual objects when the wife is present within a scene viewed by the user. If the wife leaves the scene, the next highest ranked person present may be used to display the highest ranked virtual object. As such, the face of the highest ranked person present in a scene may be used to display the highest ranked virtual object. Accordingly, the virtual objects that have received the highest rank by the user may be superimposed on the faces of persons that the user feels most comfortable around. The user may be able to designate certain faces as never having a virtual object superimposed over. For example, the user may not want to ever superimpose a virtual object over the face of his boss. It may be possible for the user to designate persons who are never to have virtual objects superimposed over their faces.

In some embodiments, rankings of persons are based on whoever appears in the user's field of vision the most often (e.g., over a time period, such as the last month or year) while the user is using the AR device. As such, the most common person to appear may receive the highest ranking. In such embodiments, the rankings of persons may be maintained without user input. For persons that frequently swap between being viewed by the user more frequently (and thus exchange rank), a threshold difference in amount of time present in the user's field of view may need to be reached before the rankings of the persons change such that the virtual object superimposed over each person's face is not swapped overly frequently. For example, a father may be used to his stock quotes appearing as superimposed over his son's face. By such a threshold being present, even if the father starts looking at the wife slightly more frequently, the threshold may cause the ranking change of the son and wife to not affect the stock quotes appearing superimposed over the son's face.

In addition to rankings of persons, which person is selected for a virtual object to be superimposed over may be based on the brightness of the person's face. For example, a person sitting under a light may have his face more illuminated than a person sitting in a shadow. As such, it may consume less power to present the virtual object as superimposed over the face of the person sitting in the shadow because the HMD does not need to output as much light to make the virtual object sufficiently visible to the user. Further, if text is present, by superimposing the virtual object over a darker face, text may be more easily readable.

Referring back to FIG. 2, virtual objects, such as virtual objects 230 and 240 may be partially transparent. As such, a user may be able to focus his attention on either the virtual object or the face of the person on which the virtual object is superimposed. Opacity of virtual objects may be set by the user. In some embodiments, the user may be able to assign different levels of opacity for different virtual objects and/or different persons. In some embodiments, the transparency of virtual objects may be at least partially based on the users eye focus. For example, if the user's eyes appear to be attempting to focus on the person's face behind the virtual object, the virtual objects may be made more transparent, moved, shrunk, and/or blurred. If the user's eyes appear to be attempting to focus on the virtual object superimposed over a person's face, the virtual object may be enlarged, moved, sharpened and/or made more opaque. Referring to system 100, the focus of the user's eyes may be determined using motion/focus tracking module 135.

The size of virtual objects may vary according to the user's distance from a person. As shown in FIG. 2, person 210 is closer to the user than person 220. As such, virtual object 230 is larger than virtual object 240. Accordingly, the size and/or orientation of a virtual object may correspond to a distance and/or orientation of the person's face on which the virtual object is superimposed. The size of the virtual object may be dynamically adjusted as a person comes closer or moves away from the user. A minimum and/or maximum size may be set for virtual objects, as such, once a person is far enough from the user, the size of the virtual object may reach a minimum and may no longer change. Similarly, once a person is close enough to the user, the size of the virtual object may reach a maximum and may no longer change.

As a person's face may move in various directions as the person speaks, virtual objects may not be moved immediately to track with the movements of the person. Rather, the person may be required to have moved for a period of time before the position of the virtual object is adjusted to the new position of the person's face. Such a delayed movement of the virtual object may assist in making text or graphical features of the virtual object easier to view for the user. For example, referring to person 210 of FIG. 2, if the face of person 210 moves slightly left and right during conversation, virtual object 230 may not move or may move less than the face of person 210. The speed of reaction of the virtual object may be set by the user. In some embodiments, if a person is moving a lot (e.g., pacing around), a virtual object superimposed over the person's face may be reassigned to being superimposed over another person. Such reassignment may make it easier for the user to interact (e.g., read) with the virtual object. As such, how stationary a person is may be factored into determining which (if any) virtual object should be superimposed on the face of the person.

Virtual objects may periodically move in position so that the user does not accidentally stare at the same person for an uncomfortably long period of time. For instance, referring to FIG. 2, if the user becomes engrossed in looking at virtual object 230, the user may make person 210 uncomfortable because person 210 will feel he is being stared at. This may be especially so if there is no conversation between person 210 and the user. Every so often, such as after a user-defined period of time, virtual object 230 may exchange places with virtual object 240 or some other virtual object. In some embodiments, virtual objects may periodically disappear to "force" the user to refocus his attention on the persons in his vicinity. In some embodiments, rather than disappearing, an alert (such as a warning "light" or change in the appearance of the virtual object) may be presented to the user via the HMD to remind the user of the amount of time he has spent focused on the virtual object.

Figure 4:
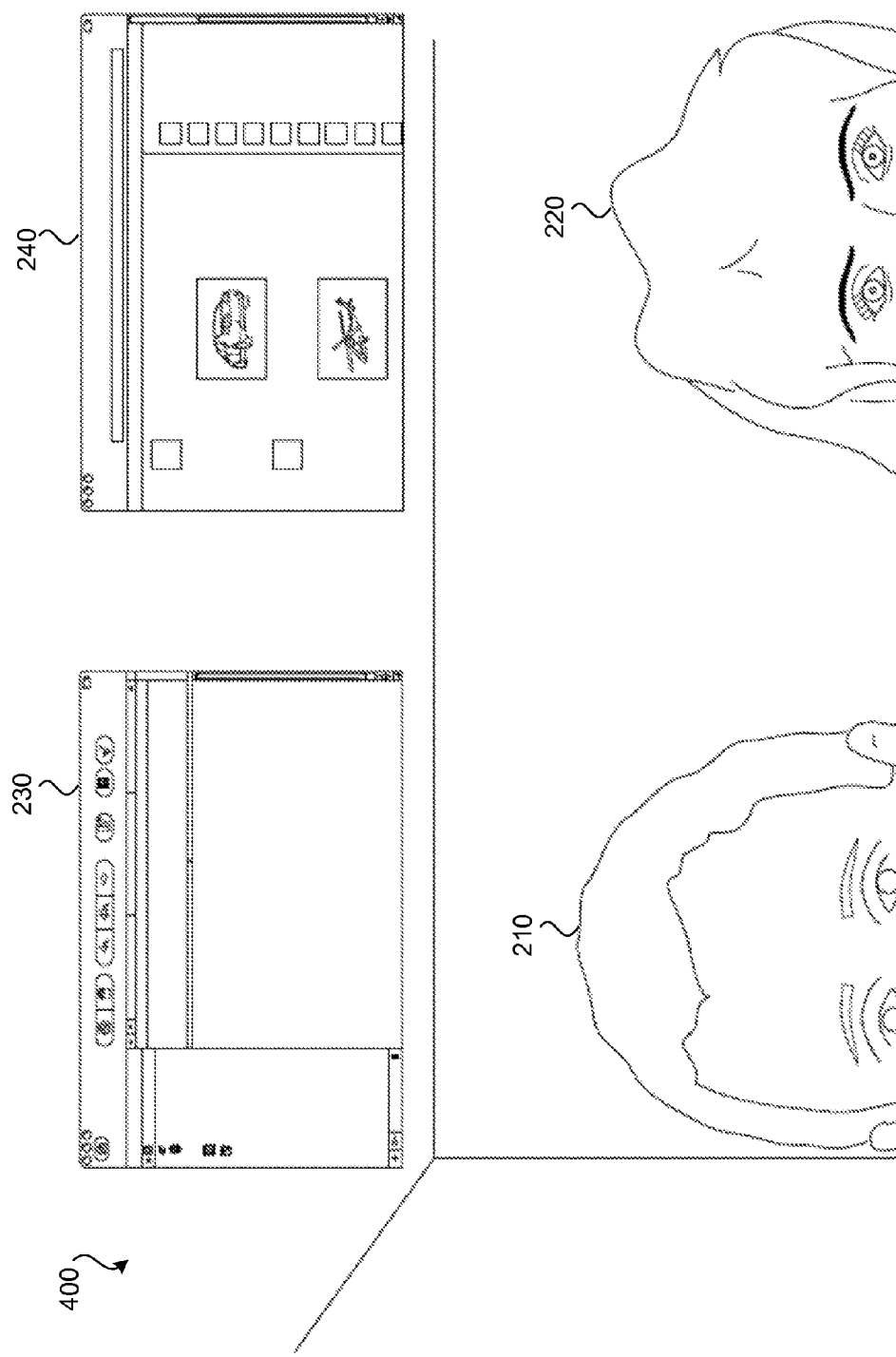
FIG. 4 illustrates an embodiment of a first-person point-of-view of a scene with virtual objects rearranged based on the direction the user is looking.

FIG. 4 illustrates an embodiment of a first-person point-of-view 400 of a scene with virtual objects rearranged based on the direction the user is looking. First-person point-of-view 400 is from the perspective of a user who is wearing a HMD of an AR device. For example, system 100 of FIG. 1 may be worn (or otherwise used) by the user such that virtual objects may be superimposed on a scene by the HMD. As such, system 100 or some other system configured to superimpose faces of persons present within a scene with virtual objects may be used to create the virtual field-of-view of FIG. 4.

Based on where the user is looking, virtual objects may "unstick" themselves from being superimposed over persons' faces. For instance, if the user looks at the floor or the ceiling, which may be detected based on an angle of the user's head and/or eyes, the virtual objects currently being displayed to the user may cease being superimposed over the persons' faces and may be displayed in a different arrangement to the user. Referring to FIG. 2, if the user looks up towards the ceiling, virtual objects 230 and 240 may become unstuck from the faces of persons 210 and 220, respectively, and may be displayed in a different arrangement. First-person point-of-view 400 represents how virtual objects 230 and 240 may be presented to the user if his vision (as determined based on the user's head angle and/or direction of vision is greater than a threshold angle), is focused significantly up. As such, the virtual objects may be arranged in a series or other arrangement and unanchored from persons' faces. When the user's vision returns down to the scene of the persons, virtual objects 230 and 240 may be re-superimposed over the faces of persons 210 and 220, respectively.

Figure 5:
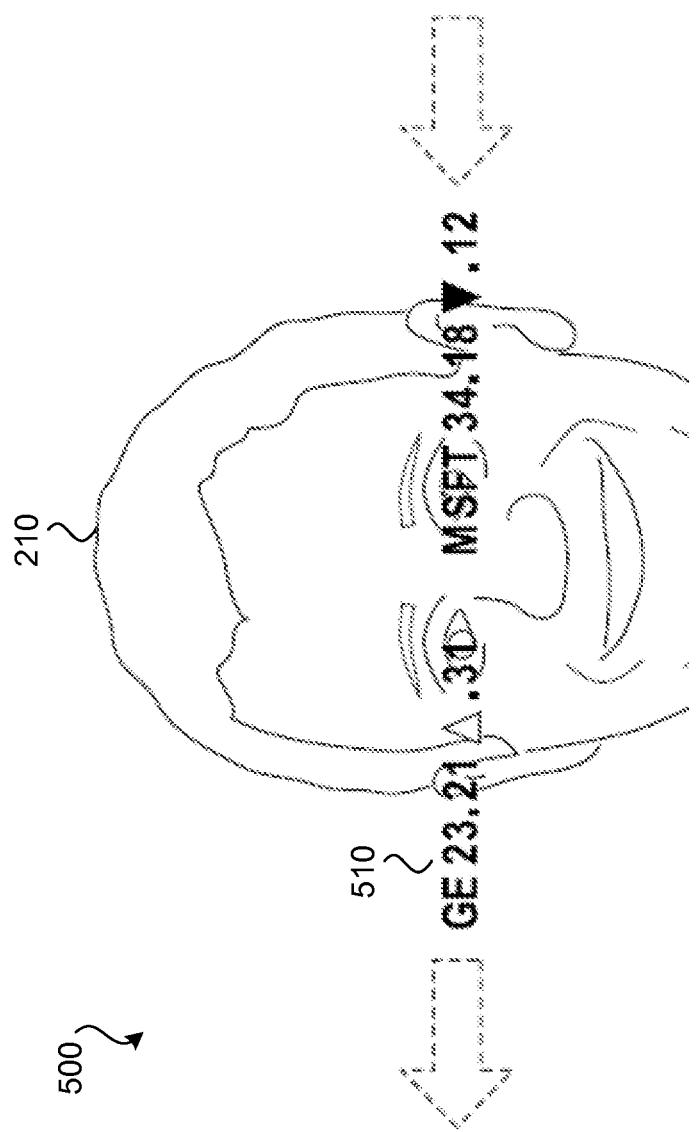
FIG. 5 illustrates an embodiment of a first-person point-of-view of a scene with text of a virtual object scrolling across the eyes of a person looking at the user.

FIG. 5 illustrates an embodiment of a first-person point-of-view 500 of a scene with text of a virtual object scrolling across the eyes of a person looking at the user. First-person point-of-view 500 is from the perspective of a user who is wearing a HMD of an AR device. For example, system 100 of FIG. 1 may be worn (or otherwise used) by the user such that virtual objects may be superimposed on a scene by the HMD. As such, system 100 or some other system configured to superimpose faces of persons present within a scene with virtual objects may be used to create the virtual field-of-view of FIG. 5.

To further maintain the appearance that the user is maintaining eye contact with the person who the user is looking at, a virtual object may be superimposed over the eyes of the person. Additionally, the virtual object may be scrolled so that the focus point of the user's eyes does not need to change to read information. For example, virtual object 510 is a stock ticker being scrolled right to left (as indicated by the imaging arrows.) While appearing to look at the eyes of person 210, the user may direct at least some of his attention to virtual object 510, without looking away or moving his eyes. Virtual object 510 may display other information than stock quotes, such as a transposition of what person 210 is seeing.

Figure 6:
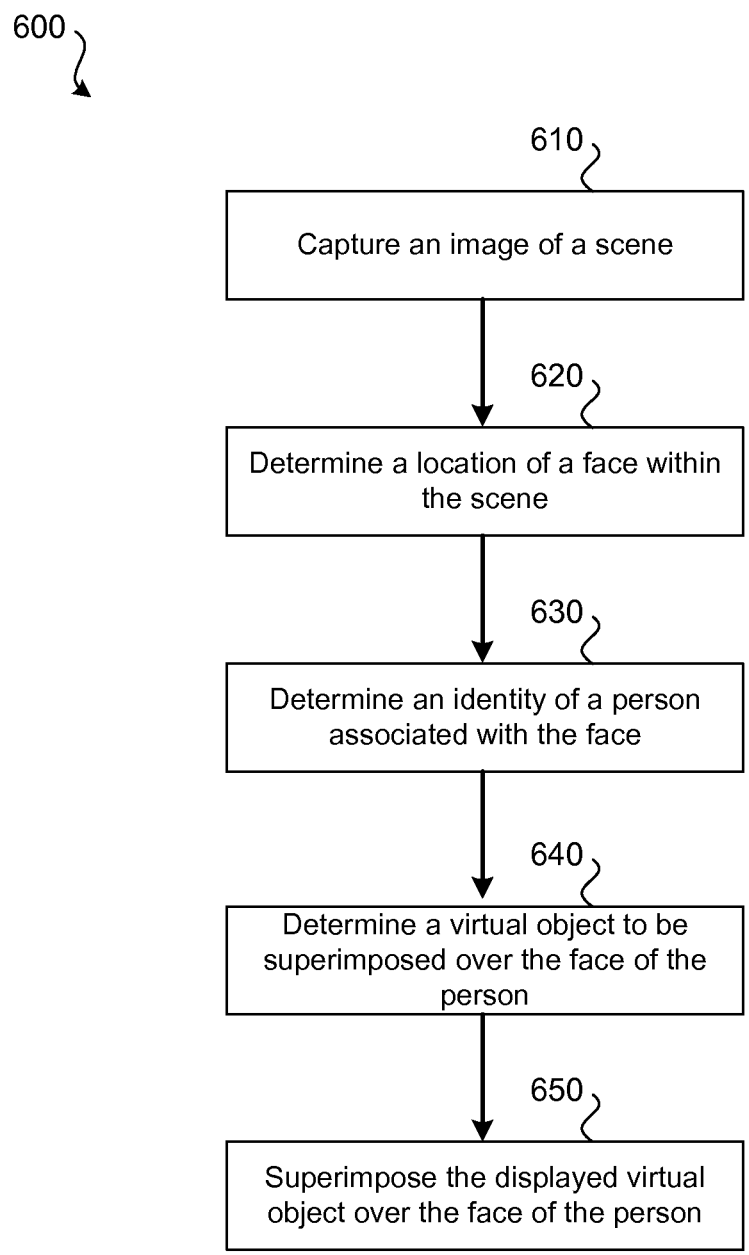
FIG. 6 illustrates an embodiment of a method for superimposing virtual objects displayed by a head-mounted display.

Various methods may be performed using system 100 of FIG. 1 or a similar system for presenting virtual objects superimposed over the face or heads of persons present in a scene viewed by a user. FIG. 6 illustrates an embodiment of a method 600 for superimposing virtual objects displayed by a head-mounted display. Method 600 may be performed using system 100 of FIG. 1 or some other system configured to function as an AR device having an HMD. A computer system, or, more generally, a computerized device may be used to perform at least some of the steps of method 600. Means for performing method 600 include image capture modules, such as cameras, face identification and tracking modules, face superimposition modules, an identity database, a motion/focus tracking module, a communication module, a user interface module, a display module, and a user preference module. At least some of the functions of the modules may be performed using processors.

At step 610, an image of a scene may be captured. The scene may be of real-world entities (e.g., people and/or objects) that are visible to a user of a AR device. The scene may be viewed live by the user directly with his eyes. The scene may not be presented to the user as a displayed image. Images of the scene may be captured periodically, such as multiple times per second (e.g., 30 frames per second). Referring to system 100 of FIG. 1, an image capture module, such as a camera, may be used to capture images. It should be understood that throughout method 600, images may be continued to be captured of the scene in order to update the location of the virtual objects displayed.

At step 620, a location of a face within the scene may be determined. The number of locations of faces within the scene determined may be based on the number of persons present within the scene. If no faces are present within the scene, no location of a face may be determined. If five persons are present for example, five locations of the faces may be determined. Referring to system 100 of FIG. 1, face identification and tracking module 120 may determine the location of a face of one or more persons present within an image captured by image capture module 110.

At step 630, for each face located at step 620 within the scene, a determination of an identity of the person associated with the face may be performed. A database of identities may be accessed in order to compare an image of the face to stored representations of persons, such as identity database 125 of system 100. If an identity of a person cannot be identified, the face may be treated as belonging to an unknown person. Referring to system 100 of FIG. 1, face identification and tracking module 120 may determine the identity of the one or more persons presents within the image captured by image capture module 110.

At step 640, a virtual object may be selected for superimposition over the face of a person present within the scene. If multiple persons are present, multiple virtual objects may be selected. As previously described, a ranking system for persons and/or virtual objects may be used to determine which virtual object is to be presented over the face of a person. In some embodiments, the virtual object selected for display superimposed over the face of a person may involve determining which person is closest to the user, which person is talking, and/or which person is looking at the user. Further, which virtual object is superimposed over the face of a person may vary after a predefined amount of time. In some embodiments, which virtual object is superimposed over the face of a person may be at least partially based on a ranking of virtual objects and/or persons set by the user, such as presented in ranking table 300. User input, such as via user interface module 160 of FIG. 1, may also be used to determine whether or not a virtual object is superimposed over the face of a person and/or which virtual object is superimposed. For example, a user may select which virtual object he wants to interact with.

At step 650, a virtual object may be superimposed over the face of a person for display. The virtual object may be located by the HMD to be presented over the face of the person based on the location identified at step 620. The virtual object may be any form of text, graphics, and/or data that the user desires to view, such as a webpage, email account, social media account, stock ticker, application, game, etc.

The content of the virtual object may be unrelated to the person whose face the virtual object is superimposed over. As such, regardless of the identity of the person and the physical characteristics of the person, the content of the virtual object may be presented to the user. While the real-world scene may be viewed by the user directly, the virtual object may be projected to the user, such as via a pair of glasses, such that the virtual object appears superimposed on the face (or head) of the person. Since an HMD may be used to present the virtual object to the user, no other person besides the user may be able to view the virtual object.

If multiple persons are present, multiple virtual objects may be presented, with a different virtual object superimposed on the face or head of each person. As the person moves, the virtual object may move such that the virtual object stays at least approximately superimposed over the face of the person. Small movements of the person's face or head may not affect the location of the virtual object to allow text or other elements of the virtual object to be more easily viewed by the user. The size of the virtual object may be adjusted based on the distance between the person over which the virtual object is superimposed and the user. By the virtual object being superimposed over the face of the person, the user may be able to appear to the person to maintain eye contact (or at least be looking at the person) while the user is directly at least some of his attention to the virtual object.

Based on the focus of the user's eyes, presentation of the superimposed virtual object may be adjusted. If the focus of the user's eyes is directed to the person on which the virtual object is superimposed, the virtual object may be made more transparent, smaller, blurred, and/or moved. If the focus of the user's eyes is directed to the virtual object, the virtual objects may be made more opaque, larger, sharpened, and/or moved. Since the virtual object is only visible to the user wearing the HMD, such changes in the appearance of the virtual object may be invisible to all persons besides the user. Accordingly, by user adjusting the focus of his eyes, the user can switch his attention between the person and the virtual object that is superimposed on the face of the person.

Figure 7:
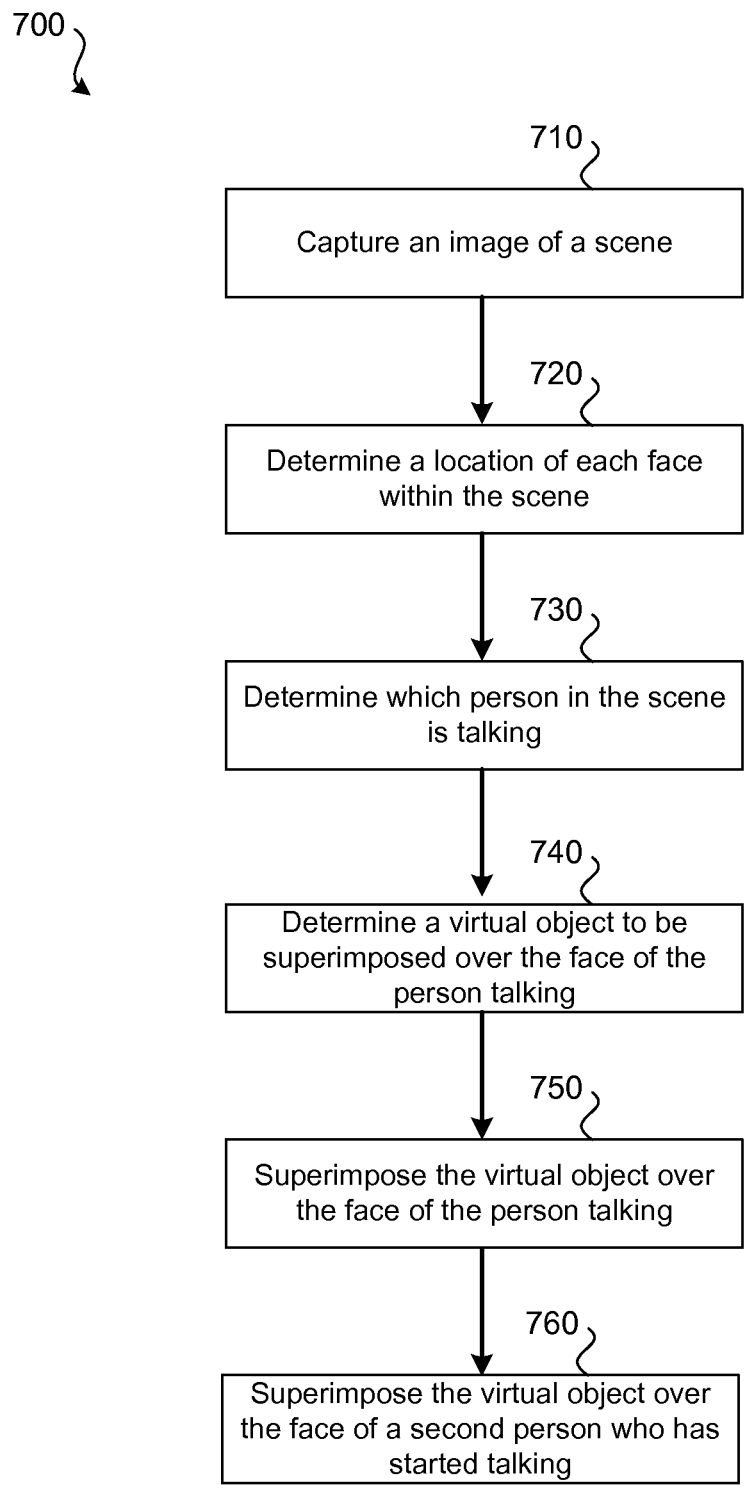
FIG. 7 illustrates an embodiment of a method for superimposing a virtual object displayed by a head-mounted display over the face of a person talking.

FIG. 7 illustrates an embodiment of a method 700 for superimposing a virtual object displayed by a head-mounted display over the face of a person talking. Method 700 may be performed using system 100 of FIG. 1 or some other system configured to function as an AR device having an HMD. A computer system, or, more generally, a computerized device may be used to perform at least some of the steps of method 700. Means for performing method 700 include image capture modules, such as cameras, face identification and tracking modules, face superimposition modules, an identity database, a motion/focus tracking module, a communication module, a user interface module, an audio capture module, a display module, and a user preference module. At least some of the functions of the modules may be performed using processors.

At step 710, an image of a scene may be captured. The scene may be of real-world entities (e.g., people and/or objects) that are visible to a user of a AR device. The scene may be viewed live by the user directly with his eyes. The scene may not be presented to the user as a displayed image. Images of the scene may be captured periodically, such as multiple times per second (e.g., 30 frames per second). Referring to system 100 of FIG. 1, an image capture module, such as a camera, may be used to capture images. It should be understood that throughout method 700, images may be continued to be captured of the scene in order to update the location of the virtual objects displayed.

At step 720, a location of a face within the scene may be determined. The number of locations of faces within the scene determined may be based on the number of persons present within the scene. If no faces are present within the scene, no location of a face may be determined. If five persons are present for example, five locations of the faces may be determined. Referring to system 100 of FIG. 1, face identification and tracking module 120 may determine the location of a face of one or more persons present within an image captured by image capture module 110.

At step 730, for each face located at step 720 within the scene, a determination of which person is talking may be performed. If multiple persons are talking, the talking person closest to the user and/or the talking person looking at the user may be determined. Similar to ranking table 300 of FIG. 3, a user may be able to define a ranking table for how virtual objects should be superimposed over persons talking. As an example, based on the behavior of the speaker, the opacity of the virtual object may be set.

TABLE 1

| Speaker's Action | Display of Virtual Object via HMD |
| --- | --- |
| Person talking (without eye contact with user) | Display opaque superimposed virtual object over the person's face. |
| Person talking (with eye contact with user) | Display transparent superimposed virtual object over the person's face. |
| Person talking (mentions user by name) | Hide superimposed virtual object. |
| No one talking | Display transparent virtual object over the face of the last person to speak. |

It should be understood that table 1 is exemplary and that a user may be permitted to customize the situations in which a virtual object is superimposed over a person talking in a scene. In some embodiments, regardless of the ranking of a person in the scene and regardless of another virtual object already being superimposed over the person's face, the highest ranked virtual object is superimposed over the person's face (and any other virtual object already superimposed is moved or hidden). As such, if the user looks at whoever happens to be talking, the user can continue to view the user's highest ranked virtual object.

At step 740, a virtual object may be selected for superimposition over the face of the talking person present within the scene. If a ranking system for virtual objects is present, the highest ranked virtual object may be superimposed over the face of the person talking. The virtual object superimposed over the face of a person may vary after a predefined amount of time. User input, such as via user interface module 160 of FIG. 1, may also be used to determine whether or not a virtual object is superimposed over the face of a person and/or which virtual object is superimposed. For example, a user may select which virtual object he wants to interact with.

At step 750, the virtual object may be superimposed over the face of the talking person for display. The virtual object may be located by the HMD to be presented over the face of the person based on the location identified at step 720 and the determination of step 730. The virtual object may be any form of text, graphics, and/or data that the user desires to view, such as a webpage, email account, social media account, stock ticker, application, game, etc.

As detailed in relation to FIG. 6, the content of the virtual object may be unrelated to the person whose face the virtual object is superimposed over. As such, regardless of the identity of the person and the physical characteristics of the person, the content of the virtual object may be presented to the user. While the real-world scene may be viewed by the user directly, the virtual object may be projected to the user, such as via a pair of glasses, such that the virtual object appears superimposed on the face (or head) of the person. Since an HMD may be used to present the virtual object to the user, no other person besides the user may be able to view the virtual object.

If the person speaking changes, the virtual object may be superimposed over the person that is now talking at step 760. As such, the virtual object may be dynamically moved to remain superimposed over whoever is talking within the scene. If no one is talking, the virtual object may remain superimposed over the previous person who spoke. As the speaker moves, the virtual object may move such that the virtual object stays at least approximately superimposed over the face of the speaker. Small movements of the person's face or head may not affect the location of the virtual object to allow text or other elements of the virtual object to be more easily viewed by the user. The size of the virtual object may be adjusted based on the distance between the person over which the virtual object is superimposed and the user. By the virtual object being superimposed over the face of the person, the user may be able to appear to the person to maintain eye contact (or at least be looking at the person) while the user is directly at least some of his attention to the virtual object.

Based on the focus of the user's eyes, presentation of the superimposed virtual object may be adjusted. If the focus of the user's eyes is directed to the speaker on which the virtual object is superimposed, the virtual object may be made more transparent, smaller, blurred, and/or moved. If the focus of the user's eyes is directed to the virtual object, the virtual objects may be made more opaque, larger, sharpened, and/or moved. Since the virtual object is only visible to the user wearing the HMD, such changes in the appearance of the virtual object may be invisible to all persons, including the speaker, besides the user. Accordingly, by the user adjusting the focus of his eyes, the user can switch his attention between the speaker and the virtual object that is superimposed on the face of the speaker. Alternatively, another form of user input, such as the push of a button, may be used to determine the user's focus.

Figure 8:
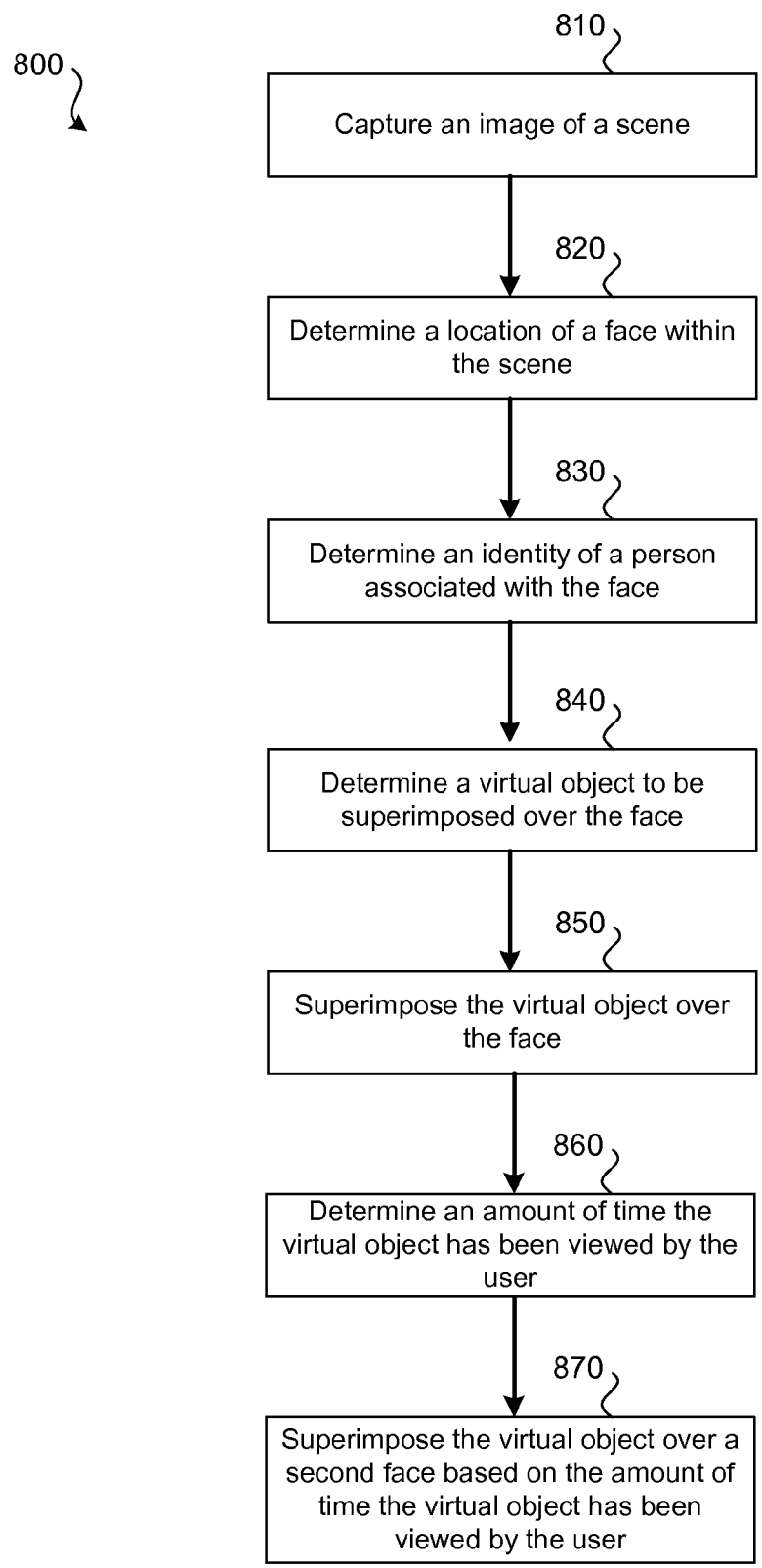
FIG. 8 illustrates an embodiment of a method for adjusting the superimposition of a virtual object displayed by a head-mounted display over the face of a person based on an amount of time the virtual object has been viewed.

FIG. 8 illustrates an embodiment of a method 800 for adjusting the superimposition of a virtual object displayed by a head-mounted display over the face of a person based on an amount of time the virtual object has been viewed by the user. Method 800 may be performed using system 100 of FIG. 1 or some other system configured to function as an AR device having an HMD. A computer system, or, more generally, a computerized device may be used to perform at least some of the steps of method 800. Means for performing method 800 include image capture modules, such as cameras, face identification and tracking modules, face superimposition modules, an identity database, a motion/focus tracking module, a communication module, a user interface module, a display module, and a user preference module. At least some of the functions of the modules may be performed using processors.

At step 810, an image of a scene may be captured. The scene may be of real-world entities (e.g., people and/or objects) that are visible to a user of a AR device. The scene may be viewed live by the user directly with his eyes. The scene may not be presented to the user as a displayed image. Images of the scene may be captured periodically, such as multiple times per second (e.g., 30 frames per second). Referring to system 100 of FIG. 1, an image capture module, such as a camera, may be used to capture images. It should be understood that throughout method 800, images may be continued to be captured of the scene in order to update the location of the virtual objects displayed.

At step 820, a location of a face within the scene may be determined. The number of locations of faces within the scene determined may be based on the number of persons present within the scene. If no faces are present within the scene, no location of a face may be determined. If five persons are present for example, five locations of the faces may be determined. Referring to system 100 of FIG. 1, face identification and tracking module 120 may determine the location of a face of one or more persons present within an image captured by image capture module 110.

At step 830, for each face located at step 820 within the scene, a determination of an identity of the person associated with the face may be performed. A database of identities may be accessed in order to compare an image of the face to stored representations of persons, such as identity database 125 of system 100. If an identity of a person cannot be identified, the face may be treated as belonging to an unknown person. Referring to system 100 of FIG. 1, face identification and tracking module 120 may determine the identity of the one or more persons presents within the image captured by image capture module 110. In some embodiments, rather than determining an identity of persons present within the scene, which person or persons are talking may be identified, such as detailed in method 700 of FIG. 7.

At step 840, a virtual object may be selected for superimposition over the face of a person present within the scene. If multiple persons are present, multiple virtual objects may be selected. As previously described, a ranking system for persons and/or virtual objects may be used to determine which virtual object is to be presented over the face of a person. In some embodiments, the virtual object selected for display superimposed over the face of a person may involve determining which person is closest to the user, which person is talking, and/or which person is looking at the user. User input, such as via user interface module 160 of FIG. 1, may also be used to determine whether or not a virtual object is superimposed over the face of a person and/or which virtual object is superimposed. For example, a user may select the virtual object with which he wants to interact.

At step 850, a virtual object may be superimposed over the face of a person for display. The virtual object may be located by the HMD to be presented over the face of the person based on the location identified at step 820. The virtual object may be any form of text, graphics, and/or data that the user desires to view, such as a webpage, email account, social media account, stock ticker, application, game, etc. The content of the virtual object may be unrelated to the person whose face the virtual object is superimposed over. As such, regardless of the identity of the person and the physical characteristics of the person, the content of the virtual object may be presented to the user. While the real-world scene may be viewed by the user directly, the virtual object may be projected to the user, such as via a pair of glasses, such that the virtual object appears superimposed on the face (or head) of the person. Since an HMD may be used to present the virtual object to the user, no other person besides the user may be able to view the virtual object.

At step 860, an amount of time that the user has spent looking at the virtual object may be determined. This may be accomplished by monitoring the direction the user is looking and the focus of the user's eyes. It may be desirable for a user to not look at a particular virtual objects for an extended period of time. Since each virtual object may be superimposed over the face of another person, if the user spends a lengthy period of time looking at the virtual object, the person may feel as if he is being stared at. Further, this may give away to the person that the user is directing his attention to virtual object rather than what is happening in the scene. The user may define an amount of time after which the user is notified or presentation of the virtual objects is adjusted. In some embodiments, a predefined threshold amount of time may be used, such as 20 seconds.

At step 870, the user may have been looking at and/or focused on a particular virtual objects for a threshold period of time, such as 20 seconds. Since the threshold period of time has been met or exceeded, the virtual object may be superimposed over a second face present within the scene. As such, if the user continues to look at the virtual object, the user will appear to be looking at a different person. In some embodiments, rather than superimposing the virtual objects over a second face, and alert may be displayed to the user to remind the user that he is been looking at a particular virtual object for an extended period of time. For instance, a flashing light may be displayed to the user, the virtual object itself may be flashed or changed in appearance, the virtual object may be made more transparent, the virtual object may shrink in size, the virtual object may be hidden, etc. In some embodiments, throughout the period of time in which the user is viewing a virtual object, the virtual objects may become more transparent. As such, the longer the user is viewing the virtual object, more will become apparent to the user how long he has been focusing his attention on the virtual object. If the user switches his eye focus to another virtual object, or to the person behind the virtual objects, the amount of time monitored at step 850 may be reset. Some other form of user input may also be used to reset the mod time determined at step 860, such as the user pushing a button on the AR device.

As with method 600 and method 700, based on the focus of the user's eyes, presentation of the superimposed virtual object may be adjusted. If the focus of the user's eyes is directed to the person on which the virtual object is superimposed, the virtual object may be made more transparent, smaller, blurred, and/or moved. If the focus of the user's eyes is directed to the virtual object, the virtual objects may be made more opaque, larger, sharpened, and/or moved. Since the virtual object is only visible to the user wearing the HMD, such changes in the appearance of the virtual object may be invisible to all persons besides the user. Accordingly, by user adjusting the focus of his eyes, the user can switch his attention between the person and the virtual object that is superimposed on the face of the person. Whenever the user directs his attention to a person or a different virtual object, the amount of time determined at step 860 may be reset. As such, the display virtual objects may remain unchanged as long as the user changes the focus of his eyes periodically.

FIG. 9 illustrates an embodiment of a method 900 for adjusting the display of virtual objects superimposed by an HMD over the face of persons talking based on where the user is looking. Method 900 may be performed using system 100 of FIG. 1 or some other system configured to function as an AR device having an HMD. A computer system, or, more generally, a computerized device may be used to perform at least some of the steps of method 900. Means for performing method 900 include image capture modules, such as cameras, face identification and tracking modules, face superimposition modules, an identity database, a motion/focus tracking module, a communication module, a user interface module, a display module, and a user preference module. At least some of the functions of the modules may be performed using processors.

At step 910, an image of a scene may be captured. The scene may be of real-world entities (e.g., people and/or objects) that are visible to a user of a AR device. The scene may be viewed live by the user directly with his eyes. The scene may not be presented to the user as a displayed image. Images of the scene may be captured periodically, such as multiple times per second (e.g., 30 frames per second). Referring to system 100 of FIG. 1, an image capture module, such as a camera, may be used to capture images. It should be understood that throughout method 900, images may be continued to be captured of the scene in order to update the location of the virtual objects displayed.

At step 920, locations of one or more faces within the scene may be determined. The number of locations of faces within the scene determined may be based on the number of persons present within the scene. If no faces are present within the scene, no location of a face may be determined. If five persons are present, for example, five locations of the faces may be determined. Referring to system 100 of FIG. 1, face identification and tracking module 120 may determine the location of a face of one or more persons present within an image captured by image capture module 110.

At step 930, for each face located at step 920 within the scene, the identity of the person associated with the face may be determined. A database of identities may be accessed in order to compare an image of the face to stored representations of persons, such as identity database 125 of system 100. If an identity of a person cannot be determined, the face may be treated as belonging to an unknown person. Referring to system 100 of FIG. 1, face identification and tracking module 120 may determine the identity of the one or more persons present within the image captured by image capture module 110.

At step 940, a virtual object may be selected for superimposition over the faces of one or more persons present within the scene. If multiple persons are present, multiple virtual objects may be selected. As previously described, a ranking system for persons and/or virtual objects may be used to determine which virtual object is to be presented over the face of a person. In some embodiments, the virtual object selected for display superimposed over the face of a person may involve determining which person is closest to the user, which person is talking, and/or which person is looking at the user. Further, which virtual object is superimposed over the face of a person may vary after a predefined amount of time. User input, such as via user interface module 160 of FIG. 1, may also be used to determine whether or not a virtual object is superimposed over the face of a person and/or which virtual object is superimposed. For example, a user may select which virtual object he wants to interact with.

At step 950, a virtual object may be superimposed over the face of a person for display. The virtual object may be located by the HMD to be presented over the face of the person based on the location identified at step 920. The virtual object may be any form of text, graphics, and/or data that the user desires to view, such as a webpage, email account, social media account, stock ticker, application, game, etc. The content of the virtual object may be unrelated to the person whose face the virtual object is superimposed over. As such, regardless of the identity of the person and the physical characteristics of the person, the content of the virtual object may be presented to the user. While the real-world scene may be viewed by the user directly, the virtual object may be projected to the user, such as via a pair of glasses, such that the virtual object appears superimposed on the face (or head) of the person. Since an HMD may be used to present the virtual object to the user, no other person besides the user may be able to view the virtual object.

If multiple persons are present, multiple virtual objects may be presented, with a different virtual object superimposed on the face or head of each person, such as in first-person point-of-view 200 of FIG. 2. As the person moves, the virtual object may move such that the virtual object stays at least approximately superimposed over the face of the person. Small movements of the person's face or head may not affect the location of the virtual object to allow text or other elements of the virtual object to be more easily viewed by the user. The size of the virtual object may be adjusted based on the distance between the person over which the virtual object is superimposed and the user. By the virtual object being superimposed over the face of the person, the user may be able to appear to the person to maintain eye contact (or at least be looking at the person) while the user is directly at least some of his attention to the virtual object.

At step 960, it may be determined that the user is looking at the ceiling or floor. This may be a compost in several ways. In some embodiments, the angle of the user's head and/or the direction the user's eyes are looking may be compared with a threshold angle off of the horizon to determine whether the user is likely looking up (e.g., at the ceiling) or down (e.g., at the floor). As an example, the threshold angle may be 60° above or below the horizon. In other embodiments, one or more of the images captured at step 910 may be used for object recognition to determine if the user is looking at the ceiling or floor. If the user is looking up or down, this may be a trigger for the AR device to modify the format in which virtual objects are displayed to the user. For instance, this may be a form of input from the user that indicates virtual objects are not to be superimposed over the faces of persons present within the scene, but rather to be presented in alternative format superimposed over the ceiling or floor. Looking up at the ceiling or down at the floor may not necessarily clue persons present within the scene in to the fact that the user is interacting with virtual objects. Rather, the user may appear to be concentrating or lost in thought.

At step 970, each of the virtual objects that are superimposed over faces of persons present within the scene may cease being superimposed over the persons and may instead be superimposed over the ceiling if the user is looking up or the floor the user is looking down. As such, when the user is looking up at the ceiling or down at the floor, movements of persons within the scene may not affect presentation of the virtual objects. Virtual objects may be presented to the user as in FIG. 3. For example, each virtual object may be presented as the same size in a horizontal series to the user. The user may be able to select a particular virtual object for enlargement. Other display formats may also be used for presentation of the virtual objects to the user when the user is looking up at the ceiling or down at the floor.

At step 980, it may be determined that the user's focus has returned to the scene containing the persons. This may be a compost in several ways. In some embodiments, the angle of the user's head and/or the direction the user's eyes are looking may be compared with a threshold angle off of the horizon to determine whether the user is likely looking at persons within a scene. As an example, the threshold angle may be 45° above or below the horizon. In other embodiments, one or more of the images captured at step 910 may be used for object recognition to determine if the user is looking in the general direction of persons. If the user is looking up or down, this may be a trigger for the AR device to modify the format in which virtual objects are displayed to the user to being superimposed over faces of persons present within the scene.

At step 990, the virtual objects may return to being superimposed over faces of persons present within the scene. As such, the virtual objects may be superimposed over the faces of the same persons over which the virtual objects are superimposed in step 950. Such steps of method 900 may repeat, for example, if the user again looks up at the ceiling or down at the floor, steps 960 and 970 may repeat.

While the above description focuses on virtual objects being superimposed over the faces of persons, it should be understood that embodiments may be created wherein the virtual objects are maintained a distance from persons' faces. For example, a virtual object may be maintained a distance to the left or right of a person's face such that a glance by the user to the left or right during a conversation can be used to view a virtual object.

Figure 10:
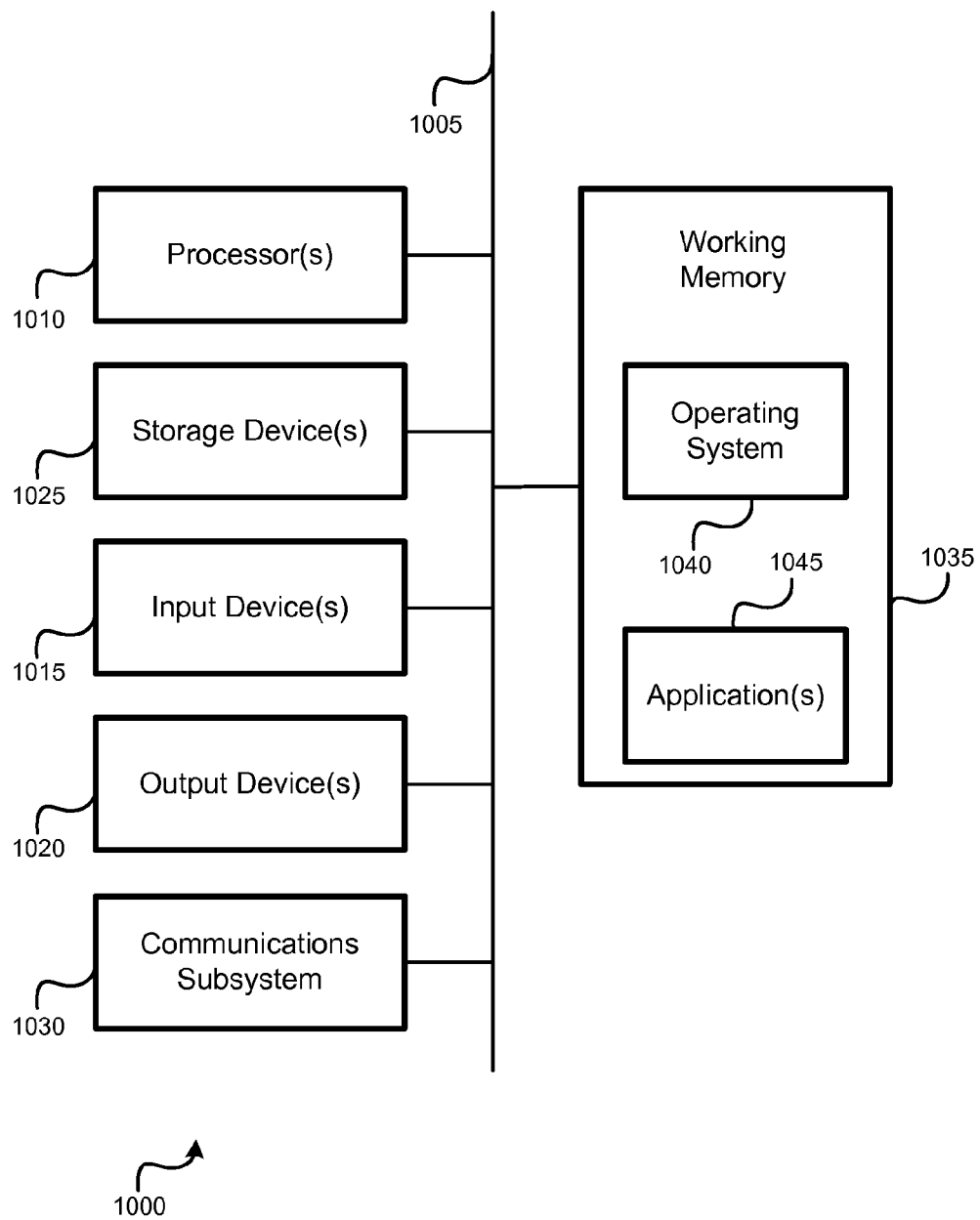
FIG. 10 illustrates an embodiment of a computer system.

A computer system as illustrated in FIG. 10 may be incorporated as part of the previously described AR devices. For example, computer system 1000 can represent some of the components of the HMDs and AR devices discussed in this application. Computer system 1000 may perform the functions of various components of system 100 of FIG. 1. Computer system 1000 may be incorporated in a wearable, mobile device. FIG. 10 provides a schematic illustration of one embodiment of a computer system 1000 that can perform the methods provided by various other embodiments. It should be noted that FIG. 10 is meant only to provide a generalized illustration of various components, any or all of which may be utilized as appropriate. FIG. 10, therefore, broadly illustrates how individual system elements may be implemented in a relatively separated or relatively more integrated manner.

The computer system 1000 is shown comprising hardware elements that can be electrically coupled via a bus 1005 (or may otherwise be in communication, as appropriate). The hardware elements may include one or more processors 1010, including without limitation one or more general-purpose processors and/or one or more special-purpose processors (such as digital signal processing chips, graphics acceleration processors, and/or the like); one or more input devices 1015, which can include without limitation a mouse, a keyboard, and/or the like; and one or more output devices 1020, which can include without limitation a display device, a printer, and/or the like.

The computer system 1000 may further include (and/or be in communication with) one or more non-transitory storage devices 1025, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 1000 might also include a communications subsystem 1030, which can include without limitation a modem, a network card (wireless or wired), an infrared communication device, a wireless communication device, and/or a chipset (such as a Bluetooth™ device, an 802.11 device, a WiFi device, a WiMax device, cellular communication facilities, etc.), and/or the like. The communications subsystem 1030 may permit data to be exchanged with a network (such as the network described below, to name one example), other computer systems, and/or any other devices described herein. In many embodiments, the computer system 1000 will further comprise a working memory 1035, which can include a RAM or ROM device, as described above.

The computer system 1000 also can comprise software elements, shown as being currently located within the working memory 1035, including an operating system 1040, device drivers, executable libraries, and/or other code, such as one or more application programs 1045, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 1025 described above. In some cases, the storage medium might be incorporated within a computer system, such as computer system 1000. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 1000 and/or might take the form of source and/or installable code, which, upon compilation and/or installation on the computer system 1000 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 1000) to perform methods in accordance with various embodiments of the invention. According to a set of embodiments, some or all of the procedures of such methods are performed by the computer system 1000 in response to processor 1010 executing one or more sequences of one or more instructions (which might be incorporated into the operating system 1040 and/or other code, such as an application program 1045) contained in the working memory 1035. Such instructions may be read into the working memory 1035 from another computer-readable medium, such as one or more of the non-transitory storage device(s) 1025. Merely by way of example, execution of the sequences of instructions contained in the working memory 1035 might cause the processor(s) 1010 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 1000, various computer-readable media might be involved in providing instructions/code to processor(s) 1010 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 1025. Volatile media include, without limitation, dynamic memory, such as the working memory 1035.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 1010 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1000.

The communications subsystem 1030 (and/or components thereof) generally will receive signals, and the bus 1005 then might carry the signals (and/or the data, instructions, etc. carried by the signals) to the working memory 1035, from which the processor(s) 1010 retrieves and executes the instructions. The instructions received by the working memory 1035 may optionally be stored on a non-transitory storage device 1025 either before or after execution by the processor(s) 1010.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A method for positioning virtual objects displayed by a head-mounted display, comprising:
    receiving a set of person rankings for a plurality of persons;
    receiving a set of virtual object rankings from the user for a plurality of virtual objects;
    determining a location of a face of a person within a real-world scene;
    determining a unique identity of the person;
    determining a relative ranking of the person within the real-world scene based on the unique identity of the person and the set of person rankings, the relative ranking being relative to other persons within the real-world scene;
    selecting a virtual object from among the plurality of virtual objects based on both the relative ranking of the person and the set of virtual object rankings, wherein the rank of the selected virtual object correlates to the relative ranking of the person; and
    displaying, via the head-mounted display, the virtual object such that the virtual object is superimposed over the face of the person.

2. The method for positioning virtual objects displayed by the head-mounted display of claim 1, wherein content of the virtual object is unrelated to the person.

3. The method for positioning virtual objects displayed by the head-mounted display of claim 1, further comprising:
    after displaying the virtual object such that the virtual object is superimposed over the face of the person, relocating the virtual object to being superimposed over a second face of a second person after a threshold period of time.

4. The method for positioning virtual objects displayed by the head-mounted display of claim 1, further comprising:
    after displaying the virtual object such that the virtual object is superimposed over the face of the person, determining a user is looking up at greater than a threshold angle; and
    in response to determining the user is looking up at greater than the threshold angle, relocating the virtual object such that the virtual object is not superimposed over the face of the person.

5. The method for positioning virtual objects displayed by the head-mounted display of claim 1, wherein the virtual object is presented by the head-mounted display such that the virtual object is visible only to a user of the head-mounted display.

6. The method for positioning virtual objects displayed by the head-mounted display of claim 1, wherein the virtual object is transparent such that the face of the person and the virtual object are simultaneously visible to a user of the head-mounted display.

7. The method for positioning virtual objects displayed by the head-mounted display of claim 1, further comprising:
   determining an amount of motion by the person; and
   after displaying the virtual object such that the virtual object is superimposed over the face of the person, displaying, via the head-mounted display, the virtual object such that the virtual object is superimposed over the face of a second person due to the determined amount of motion by the person.

8. The method for positioning virtual objects displayed by the head-mounted display of claim 1, further comprising:
   before displaying the virtual object such that the virtual object is superimposed over the face of the person, selecting the person from a second plurality of persons using brightness levels of each person of the second plurality of persons.

9. A system for presenting virtual objects, comprising:
   an image capture device;
   a head-mounted display;
   a processor; and
   a memory communicatively coupled with and readable by the processor and having stored therein processor-readable instructions which, when executed by the processor, cause the processor to:
      receive a set of person rankings for a plurality of persons;
      receive a set of virtual object rankings from the user for a plurality of virtual objects;
      determine a location of a face of a person within a real-world scene using an image captured by the image capture device;
      determine a unique identity of the person;
      determine a relative ranking of the person within the real-world scene based on the unique identity of the person and the set of person rankings, the relative ranking being relative to other persons within the real-world scene;
      select a virtual object from among the plurality of virtual objects based on both the relative ranking of the person and the set of virtual object rankings, wherein the rank of the selected virtual object correlates to the relative ranking of the person; and
      cause, via the head-mounted display, the virtual object to be displayed such that the virtual object is superimposed over the face of the person.

10. The system for presenting virtual objects of claim 9, wherein content of the virtual object is unrelated to the person.

11. The system for presenting virtual objects of claim 9, wherein the processor-readable instructions further comprise processor-readable instructions which, when executed by the processor, cause the processor to:
    after causing the virtual object to be displayed such that the virtual object is superimposed over the face of the person, relocate the virtual object to being superimposed over a second face of a second person after a threshold period of time.

12. The system for presenting virtual objects of claim 9, wherein the processor-readable instructions further comprise processor-readable instructions which, when executed by the processor, cause the processor to:
    after causing the virtual object to be displayed such that the virtual object is superimposed over the face of the person, determine a user of the head-mounted display is looking up at greater than a threshold angle; and
    in response to determining the user is looking up at greater than the threshold angle, cause display of the virtual object to be relocated such that the virtual object is not superimposed over the face of the person.

13. The system for presenting virtual objects of claim 9, wherein the virtual object is presented by the head-mounted display such that the virtual object is visible only to a user of the head-mounted display.

14. The system for presenting virtual objects of claim 9, wherein the virtual object is transparent such that the face of the person and the virtual object are simultaneously visible to a user of the head-mounted display.

15. The system for presenting virtual objects of claim 9, wherein the processor-readable instructions further comprise processor-readable instructions which, when executed by the processor, cause the processor to:
    determine an amount of motion by the person; and
    after causing the virtual object to be displayed such that the virtual object is superimposed over the face of the person, causing the virtual object to be displayed such that the virtual object is superimposed over the face of a second person due to the determined amount of motion by the person.

16. The system for presenting virtual objects of claim 9, wherein the processor-readable instructions further comprise processor-readable instructions which, when executed by the processor, cause the processor to:
    before causing the virtual object to be displayed such that the virtual object is superimposed over the face of the person, select the person from a second plurality of persons using brightness levels of each person of the second plurality of persons.

17. A computer program product residing on a non-transitory processor-readable medium for positioning virtual objects displayed by a head-mounted display, the computer program product comprising processor-readable instructions configured to cause a processor to:
    receive a set of person rankings for a plurality of persons;
    receive a set of virtual object rankings from the user for a plurality of virtual objects;
    determine a location of a face of a person within a real-world scene;
    determine a unique identity of the person;
    determine a relative ranking of the person within the real-world scene based on the unique identity of the person and the set of person rankings, the relative ranking being relative to other persons within the real-world scene;
    select a virtual object from among the plurality of virtual objects based on both the relative ranking of the person and the set of virtual object rankings, wherein the rank of the selected virtual object correlates to the relative ranking of the person; and
    cause, via the head-mounted display, the virtual object to be displayed such that the virtual object is superimposed over the face of the person.

18. The computer program product for positioning virtual objects displayed by the head-mounted display of claim 17, wherein content of the virtual object is unrelated to the person.

19. The computer program product for positioning virtual objects displayed by the head-mounted display of claim 17, wherein the processor-readable instructions further comprise processor-readable instructions which, when executed by the processor, cause the processor to:

after causing the virtual object to be displayed such that the virtual object is superimposed over the face of the person, relocate the virtual object to being superimposed over a second face of a second person after a threshold period of time.

20. The computer program product for positioning virtual objects displayed by the head-mounted display of claim 17, wherein the processor-readable instructions further comprise processor-readable instructions which, when executed by the processor, cause the processor to:

after causing the virtual object to be displayed such that the virtual object is superimposed over the face of the person, determine a user of the head-mounted display is looking up at greater than a threshold angle; and in response to determining the user is looking up at greater than the threshold angle, cause display of the virtual object to be relocated such that the virtual object is not superimposed over the face of the person.

21. The computer program product for positioning virtual objects displayed by the head-mounted display of claim 17, wherein the virtual object is presented by the head-mounted display such that the virtual object is visible only to a user of the head-mounted display.

22. The computer program product for positioning virtual objects displayed by the head-mounted display of claim 17, wherein the virtual object is transparent such that the face of the person and the virtual object are simultaneously visible to a user of the head-mounted display.

23. The computer program product for positioning virtual objects displayed by the head-mounted display of claim 17, wherein the processor-readable instructions further comprise processor-readable instructions which, when executed by the processor, cause the processor to:

determine an amount of motion by the person; and after causing the virtual object to be displayed such that the virtual object is superimposed over the face of the person, causing the virtual object to be displayed such that the virtual object is superimposed over the face of a second person due to the determined amount of motion by the person.

24. The computer program product for positioning virtual objects displayed by the head-mounted display of claim 17, wherein the processor-readable instructions further comprise processor-readable instructions which, when executed by the processor, cause the processor to:

before causing the virtual object to be displayed such that the virtual object is superimposed over the face of the person, select the person from a second plurality of persons using brightness levels of each person of the second plurality of persons.

25. An apparatus for positioning displayed virtual objects, comprising:

means for receiving a set of person rankings for a plurality of persons;

means for receiving a set of virtual object rankings from the user for a plurality of virtual objects;

means for determining a location of a face of a person within a real-world scene;

means for determining a unique identity of the person;

means for determining a relative ranking of the person within the real-world scene based on the unique identity of the person and the set of person rankings, the relative ranking being relative to other persons within the real-world scene;

means for selecting a virtual object from among the plurality of virtual objects based on both the relative ranking of the person and the set of virtual object rankings, wherein the rank of the selected virtual object correlates to the relative ranking of the person; and means for displaying the virtual object such that the virtual object is superimposed over the face of the person.

26. The apparatus for positioning displayed virtual objects of claim 25, wherein content of the virtual object is unrelated to the person.

27. The apparatus for positioning displayed virtual objects of claim 25, further comprising:

means for relocating the virtual object to being superimposed over a second face of a second person after a threshold period of time, wherein relocating occurs after displaying the virtual object such that the virtual object is superimposed over the face of the person.

28. The apparatus for positioning displayed virtual objects of claim 25, further comprising:

means for determining a user is looking up at greater than a threshold angle, wherein determining occurs after displaying the virtual object such that the virtual object is superimposed over the face of the person; and means for relocating the virtual object such that the virtual object is not superimposed over the face of the person, wherein relocating occurs in response to determining the user is looking up at greater than the threshold angle.

29. The apparatus for positioning displayed virtual objects of claim 25, wherein the virtual object is presented such that the virtual object is visible only to a user of the apparatus.

30. The apparatus for positioning displayed virtual objects of claim 25, wherein the virtual object is transparent such that the face of the person and the virtual object are simultaneously visible to a user of the apparatus.

31. The apparatus for positioning displayed virtual objects of claim 25, further comprising:

means for determining an amount of motion by the person; and means for displaying the virtual object such that the virtual object is superimposed over the face of a second person due to the determined amount of motion by the person.

32. The apparatus for positioning displayed virtual objects of claim 25, further comprising:

means for selecting the person from a second plurality of persons using brightness levels of each person of the second plurality of persons prior to displaying the virtual object such that the virtual object is superimposed over the face of the person.

33. The method for positioning virtual objects displayed by the head-mounted display of claim 1, further comprising modifying the set of person rankings based on a number of times the person appears within the user's field of view.

* * * * *